US012060016B2

(12) United States Patent
Wilson

(10) Patent No.: US 12,060,016 B2
(45) Date of Patent: *Aug. 13, 2024

(54) MOUNTING DEVICES FOR ORNAMENTS

(71) Applicant: Stephen E. Wilson, Riverview, FL (US)

(72) Inventor: Stephen E. Wilson, Riverview, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,199

(22) Filed: Jul. 31, 2023

(65) Prior Publication Data

US 2023/0373405 A1  Nov. 23, 2023

Related U.S. Application Data

(63) Continuation-in-part of application No. 17/568,420, filed on Jan. 4, 2022, now Pat. No. 11,724,653.

(Continued)

(51) Int. Cl.
*B60R 13/00* (2006.01)
*B60Q 1/26* (2006.01)
(Continued)

(52) U.S. Cl.
CPC .............. *B60R 13/005* (2013.01); *B60Q 1/28* (2013.01); *B60R 16/02* (2013.01);
(Continued)

(58) Field of Classification Search
CPC ....... B60R 13/00; B60R 13/005; B60Q 1/263; B60Q 1/2634; B60Q 1/2638; B60Q 1/2661; B60Q 1/28; B60Q 2900/30
See application file for complete search history.

(56) References Cited

U.S. PATENT DOCUMENTS 1,666,003 A * 4/1928 Crystler ................... B60Q 1/28
                                                                362/502
4,061,303 A * 12/1977 Ridgway ............... B60R 13/005
                                                                248/587

(Continued)

FOREIGN PATENT DOCUMENTS

CN       107878351 A  *  4/2018  .......... B60R 13/005
CN       109606295 A  *  4/2019
(Continued)

*Primary Examiner* — Barry Gooden, Jr.
(74) *Attorney, Agent, or Firm* — DP IP GROUP; Franco S. De Liguori

(57) ABSTRACT

An ornament mounting device has a support member configured for supporting an ornament. The support member has a keyed structure, including dentations, along an internal perimeter of the support member, and a pair of through channels formed along an outside perimeter of the support member at opposite regions. A base member includes grooves configured to accommodate the dentations of the support member. A locking pin is seated in each of a pair of recesses of the base member. Each locking pin includes a biasing member configured to exert an outward force on the locking pin relative to the base member and configured to lockingly interact with the keyed structure of the support member. A mounting assembly is configured to removably mount the support member and base member to a structural surface.

20 Claims, 24 Drawing Sheets

Related U.S. Application Data

(60) Provisional application No. 63/138,639, filed on Jan. 18, 2021.

(51) Int. Cl.
  *B60Q 1/28* (2006.01)
  *B60R 16/02* (2006.01)
  *F21S 9/03* (2006.01)
  *F21V 23/06* (2006.01)

(52) U.S. Cl.
  CPC ............ *B60Q 2900/30* (2013.01); *F21S 9/032* (2013.01); *F21V 23/06* (2013.01)

(56) References Cited

U.S. PATENT DOCUMENTS

| | | | | |
|---|---|---|---|---|
| 4,067,528 | A * | 1/1978 | Motting | G09F 7/16 |
| | | | | 280/762 |
| 5,119,064 | A * | 6/1992 | Perlman | B60R 13/005 |
| | | | | 340/568.4 |
| 5,262,210 | A * | 11/1993 | Sellers | B60R 13/005 |
| | | | | 280/727 |
| 5,376,415 | A * | 12/1994 | Calabro | B60R 13/005 |
| | | | | 280/727 |
| 5,585,151 | A * | 12/1996 | Bruning | B60R 13/005 |
| | | | | 280/727 |
| 7,775,695 | B1 * | 8/2010 | Rose | B60Q 1/068 |
| | | | | 362/543 |
| 8,071,184 | B1 * | 12/2011 | Dodt, Jr. | B60R 13/005 |
| | | | | 280/727 |
| 10,207,761 | B2 * | 2/2019 | McKinster | B62J 50/225 |
| 11,724,653 | B2 * | 8/2023 | Wilson | B60R 13/005 |
| | | | | 428/31 |
| 2004/0037635 | A1 * | 2/2004 | Viscount | G09F 21/04 |
| | | | | 403/348 |
| 2007/0124972 | A1 * | 6/2007 | Ratcliffe | G09F 21/04 |
| | | | | 40/591 |
| 2008/0028650 | A1 * | 2/2008 | Ratcliffe | G09F 21/04 |
| | | | | 40/591 |
| 2014/0246839 | A1 * | 9/2014 | Hebenstreit | F16D 1/0888 |
| | | | | 280/124.125 |
| 2016/0054644 | A1 * | 2/2016 | Samardzic | H04N 23/54 |
| | | | | 396/428 |
| 2018/0328390 | A1 * | 11/2018 | Depail | F16B 5/0233 |
| 2022/0274536 | A1 * | 9/2022 | Molyneux | B60R 13/005 |
| 2022/0274537 | A1 * | 9/2022 | Molyneux | B60R 13/005 |

FOREIGN PATENT DOCUMENTS

| | | | | |
|---|---|---|---|---|
| CN | 110329162 | A * | 10/2019 | |
| CN | 111775614 | A * | 10/2020 | |
| CN | 111933471 | A * | 11/2020 | ............ B60R 13/005 |
| CN | 112693402 | A * | 4/2021 | ............ B60R 11/00 |
| CN | 114734934 | A * | 7/2022 | |
| CN | 114954272 | A * | 8/2022 | |
| CN | 115195660 | A * | 10/2022 | ............ B60R 13/005 |
| DE | 3803970 | A1 * | 10/1988 | ............ B60R 13/005 |
| DE | 19915835 | A1 * | 10/2000 | ............ B60Q 1/0088 |
| DE | 10000037 | A1 * | 7/2001 | ............ B60R 13/005 |
| DE | 10003917 | A1 * | 7/2001 | ............ B60R 13/005 |
| DE | 202009002669 | U1 * | 7/2009 | ............ B60R 13/005 |
| DE | 102015106106 | A1 * | 10/2016 | |
| DE | 102015106108 | A1 * | 10/2016 | |
| EP | 2022677 | A2 * | 2/2009 | ............ B60R 13/005 |
| FR | 2675756 | A1 * | 10/1992 | ............ B60R 13/005 |
| GB | 2458302 | A * | 9/2009 | ............ B60Q 1/2615 |
| WO | WO-2014167589 | A1 * | 10/2014 | ......... B60K 15/0409 |
| WO | WO-2018197773 | A1 * | 11/2018 | ............ B60R 13/005 |

* cited by examiner

MOUNTING DEVICES FOR ORNAMENTS

CROSS-REFERENCE TO RELATED APPLICATIONS

This application is a Continuation-In-Part of U.S. patent application Ser. No. 17/568,420, filed Jan. 4, 2022, now U.S. Pat. No. 11,724,653, issued on Aug. 15, 2023, which claims the benefit of U.S. Provisional Patent Application No. 63/138,639, filed on Jan. 18, 2021, the contents of which are incorporated herein by reference in their entirety.

BACKGROUND

Technical Field

The present invention relates generally to devices for mounting ornaments. More particularly, the present invention relates to mounting devices for ornaments designed to prevent and/or hinder the unauthorized removal or theft of such ornaments.

Background Information

Ornaments are decorative objects used to embellish or enhance the appearance of something. They can be made from various materials like metal, glass, wood, or plastic, and are often used to adorn homes, automobiles, or personal accessories. Ornaments come in a wide range of shapes, sizes, and designs, and are commonly associated with festive occasions or personal expression of style.

For example, many automobiles have hood ornaments depicting, for example, automobile manufacturer logos. Additionally, some automobile owners desirous to customize their vehicles may wish to change a stock hood ornament with a novelty hood ornament that represents a university, a sports team, organization, or characters, for example.

A major problem with ornaments is that they are susceptible to being stolen, especially ornaments displayed outside where they are more vulnerable to theft. For example, automobile hood ornaments are often targets of vandalism and theft. This is especially true for custom hood ornaments.

Consequently, there is a need for a mounting device for ornaments that include anti-theft features capable of preventing and/or hindering the unauthorized removal or theft of such ornaments.

SUMMARY

According to an aspect of the present invention, embodiments of mounting devices for ornaments are provided.

In one embodiment, the ornament mounting device has a support member configured for supporting an ornament, the support member having a keyed structure, including dentations, along an internal perimeter of the support member, and a pair of through channels formed along an outside perimeter of the support member at opposite regions. A base member has a top surface dimensioned to fit within the internal perimeter of the support member, a bottom surface, a perimeter disposed between the top and bottom surfaces, a pair of recesses formed at opposite regions along the perimeter, and grooves formed on the perimeter and configured to accommodate the dentations of the support member. A locking pin is seated in each of the pair of recesses of the base member, each locking pin including a biasing member configured to exert an outward force on the locking pin relative to the base member and configured to lockingly interact with the keyed structure of the support member. A mounting assembly is configured for removably mounting the support member and base member to a structural surface.

In an embodiment, the mounting assembly comprises a housing member, a holding member connected to the housing member, a suction cup device configured for connection to the holding member and to provide a suction force for removably connecting the housing member to a structural surface by suction, and an actuating member for activating/deactivating a suction force of the suction cup device.

The actuator is configured for undergoing movement relative to the holding member between a first position, in which the actuator is configured to activate the suction cup device to generate a suction force for removably connecting the ornament mounting device to a structural surface, and a second position, in which the actuator is configured to deactivate the suction cup device and release the suction force to allow the ornament mounting device to be removed from the structural surface.

The ornament mounting device includes a key element for unlocking the support member from the base member, and for displacing the actuator of the mounting assembly from the first position to the second position.

The base member includes an electrical socket configured to receive a light source. An electrical assembly provides electrical power to the light source.

A USB connector is connected to the electrical assembly for use as a power interface to supply power to the electrical assembly.

In one embodiment, the light source is powered by a replaceable battery.

In another embodiment, the ornament mounting device includes a solar panel for receiving sunlight to supply power to the electrical assembly for providing electrical power to the light source.

In another embodiment, the ornament mounting device includes a wireless transceiver for wirelessly controlling operations of the light source. In an exemplary embodiment, a portable and remote RF controller is provided for wireless communication with the transceiver to control operations of the light source.

In other embodiments, wireless transceiver can be configured to allow adjustment of operating parameters of the ornament mounting device, such as light intensity, light color, etc., by way of a graphical user interface (GUI) provided on a computing device, for example, a smartphone, tablet or computer.

In some embodiments, the GUI can include factory preset values for various operating parameters of ornament mounting device from which a user can select. Further, a user can store, by way of the GUI, one or more custom configurations directed to different settings for ornament mounting device. The GUI can be implemented as an application (APP) installable on the computing device, such as mobile phones (e.g., smartphones).

In other embodiments, the wireless transceiver may be a Bluetooth® transceiver configured to provide wireless control of the light source via a mobile device. The Bluetooth® transceiver can be configured to turn the light source on/off, change the light intensity, or change the light color (e.g., wavelength) of the light source. A dedicated APP for a Bluetooth® pairing can be executed in the mobile device.

In yet another embodiment, the ornament mounting device includes a light sensor configured to activate the light source when ambient light falls below a threshold.

In still another embodiment, the ornament mounting device includes a motion sensor configured to activate the light source when the structural surface on which ornament mounting device is mounted is in motion.

In another exemplary embodiment, the structural surface on which the ornament mounting device is mounted is the hood of an automobile.

These and other features and advantages of the present invention will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention described herein provide devices configured for mounting ornaments to various types of structural surfaces. The ornament mounting devices according to the present invention contain one or more anti-theft features designed to prevent and/or hinder the unauthorized removal and/or theft of the ornaments from structural surfaces to which they are mounted.

FIGS. 1-8 show an embodiment of an ornament mounting device, generally designated with numeral 10, configured for removably attaching an ornament to an automobile hood. As described in more detail herein, ornament mounting device 10 provides an anti-theft feature preventing removal of the hood ornament without the use of a special purpose tool (hereinafter referred to also as a "key" or "key element").

Figure 1:
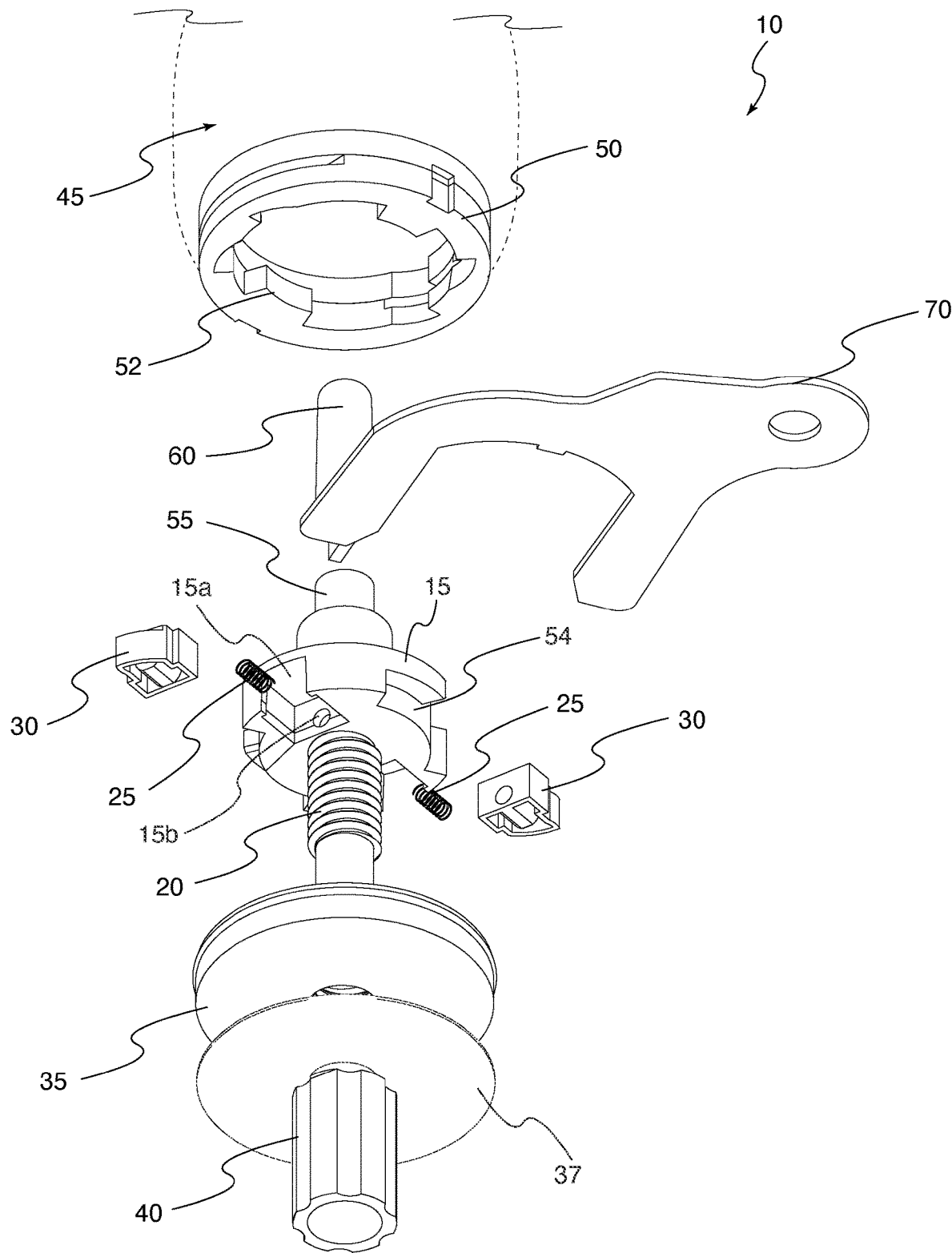
FIG. 1 is an exploded view of an ornament mounting device in accordance with a first embodiment of the present invention.

FIG. 1 shows an embodiment of hood ornament mounting device 10 in an exploded view. The hood ornament mounting device 10 has a base member 15 having a generally circular cross section. The base member 15 includes a threaded rod 20 extending from a bottom surface of the base member 15. Herein, the term "bottom" refers to a side of the base member 15 configured to face and/or contact a surface of an automobile hood when the hood ornament mounting device 10 is assembled on the automobile hood. The threaded rod 20 is configured to extend through the automobile hood such that a washer 35 and rubber washer 37 can be held on a top surface of the automobile hood, and a nut 40 can be seated on the threaded rod 20 on an opposite side of the automobile hood. The nut 40 has threads matching the threads 204 (shown in FIG. 2) of the threaded rod 20. Additionally, the washer 35 can be threaded 206 (shown in FIG. 2) as well. In other embodiments, the washer 35 does not have threads. The rubber washer 37 can be provided as a protective barrier between the washer 35 and the surface of the automobile hood. The rubber washer 37 can prevent damage, such as scratches and dents, for example, to the surface of the automobile hood. Additionally, the rubber washer 37 can prevent water infiltration, thus reducing the likelihood of oxidation of the region of the automobile hood underlying the washer 35.

The base member 15 has recess seats 15b formed in recesses 15a on at least two opposing sides along an outside perimeter of the base member 15. Locking pins 30 are seated in the recesses 15a. A spring 25 supported by the recess seat 15b in each recess 15a exerts an outward force on the locking pin 30 relative to the base member 15. Thus, when in an assembled state, the locking pins 30 are biased by spring 25 in an outward direction (e.g., in a direction away from base member 15). The spring 25 can be a compression spring or other appropriate type of spring.

The locking pins 30 lockingly interact with a keyed structure. The keyed structure is formed on an internal perimeter of a ring member 50 and includes dentations 52. The base member 15 can be inserted into a central opening defined by the internal perimeter of the ring member 50. A quarter turn of the ring member 50 with respect to the base member 15 causes the locking pins 30 to rotate from their insertion position to a locking position within the ring member 50. In other embodiments, more or less than a quarter turn of the ring member 50 causes the locking pins 30 to rotate from their insertion position to the locking position within the ring member 50.

Figure 2:
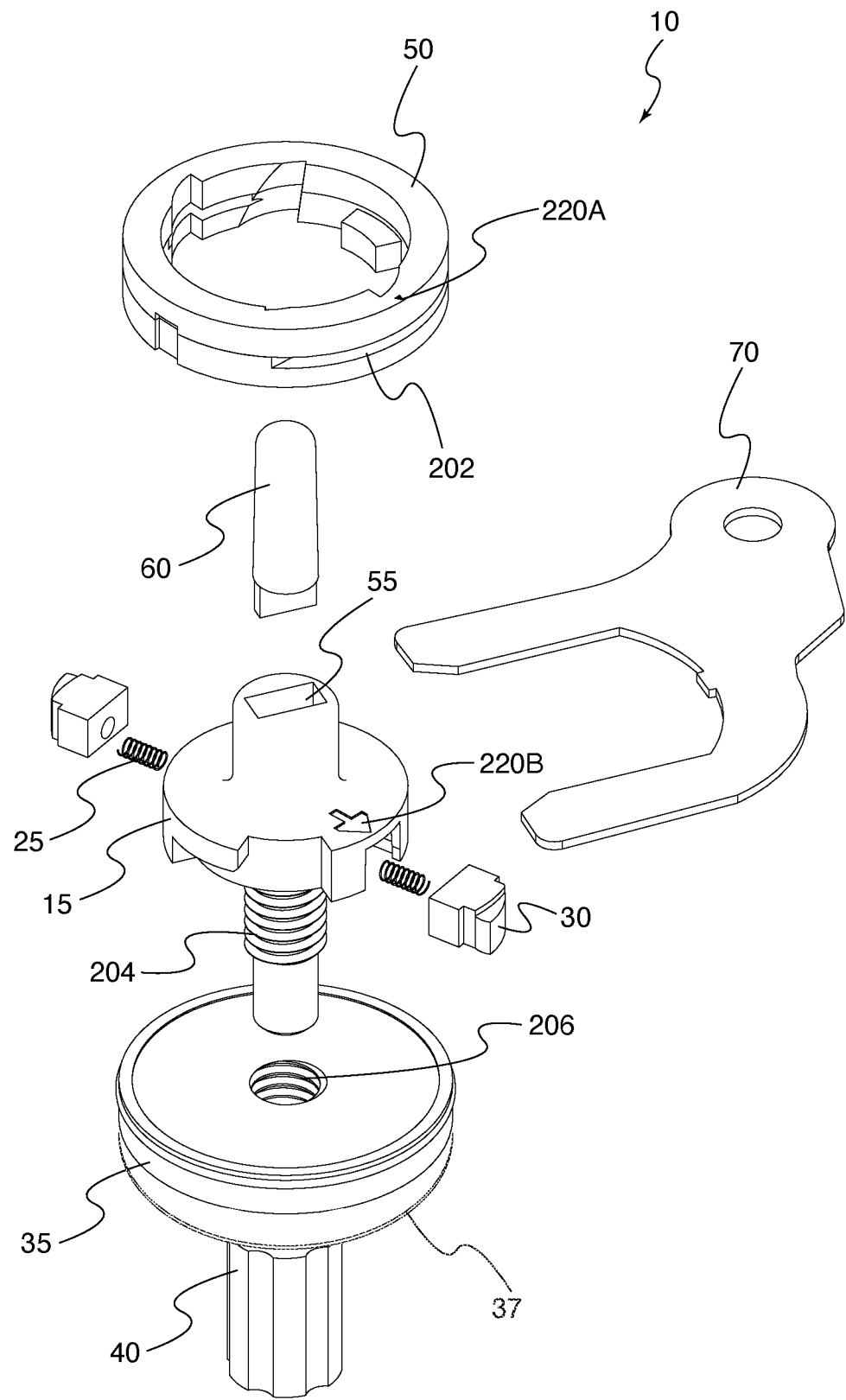
FIG. 2 is another exploded view of the ornament mounting device shown in FIG. 1.

Once the locking pins 30 are engaged in the locking position, the ring member 50 cannot be rotated against the base member 15 back to the original, e.g., disengaging, position without use of a key 70. Thus, embodiments of the present invention provide an anti-theft mechanism for the hood ornament. The dentations 52 is configured to slide into grooves 54. With the dentations 52 engaged with the grooves 54, the ring member 50 is securely held by the base member 15. As shown in FIG. 2, the key 70 includes protrusions configured to enter the through channels 202. Each protrusion engages with a respective locking pin 30 to exert an inward force on the locking pin 30 to unlock the locking pin 30 from the keyed structure.

The ring member 50 can be formed as a part of a hood ornament 45 in some embodiments. In other embodiments, the ring member 50 can be embedded in the hood ornament 45. In some embodiments, the base member 15 includes an electrical socket 55 configured to receive a light source 60, such as a light emitting diode (LED) lamp or incandescent light bulb, for example. Electrical wires from the electrical socket 55 can be passed through a hole 402, shown in FIG. 4B, formed along a longitudinal axis of the threaded rod 20 and onward to a wiring harness or battery. In some embodiments, the light source 60 can be powered by a replaceable battery. The replaceable battery can be integrated with the hood ornament mounting device 10. Alternatively, the replaceable battery can be housed in a separate casing and connected by wires to the light source 60. In other embodiment, the light source 60 is coupled by wires directly to a fuse box of the automobile.

Figure 4A:
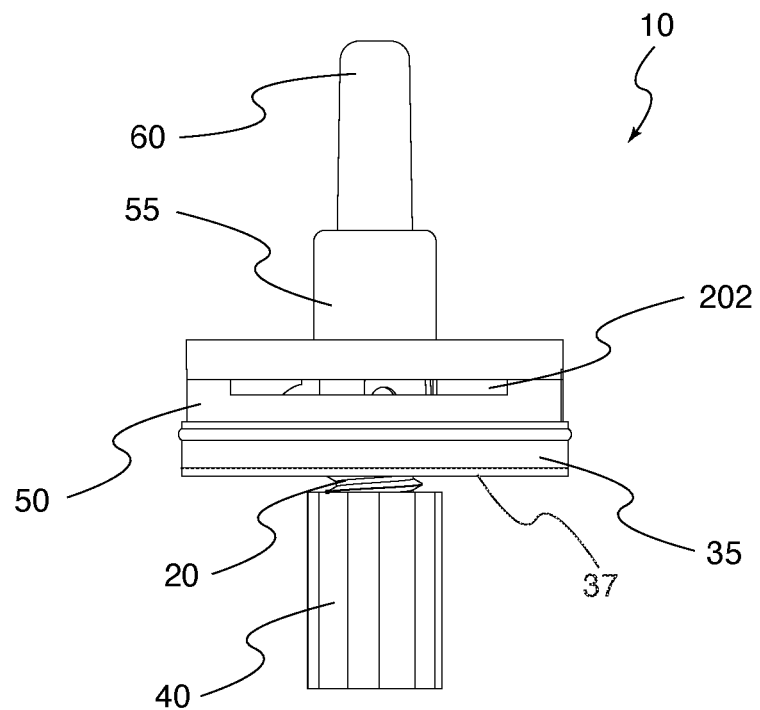
FIG. 4A is a view of the ornament mounting device similar to FIG. 3, except that in FIG. 4A a cap covering an electrical socket has been removed and replaced with a light source.
Figure 4B:
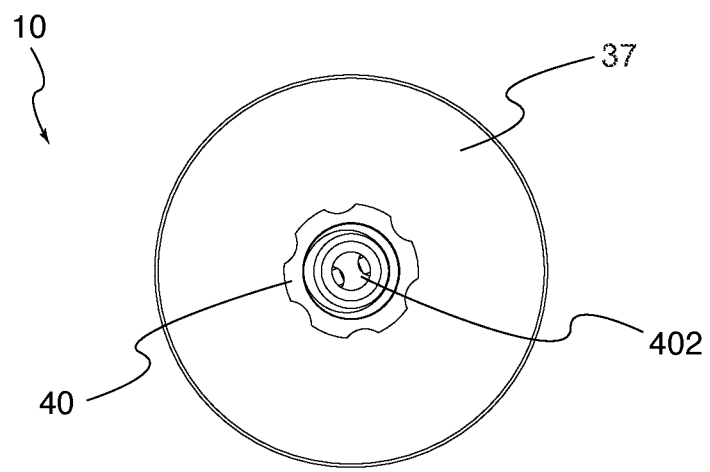
FIG. 4B is a bottom view of the ornament mounting device in FIG. 4A.
Figure 4C:
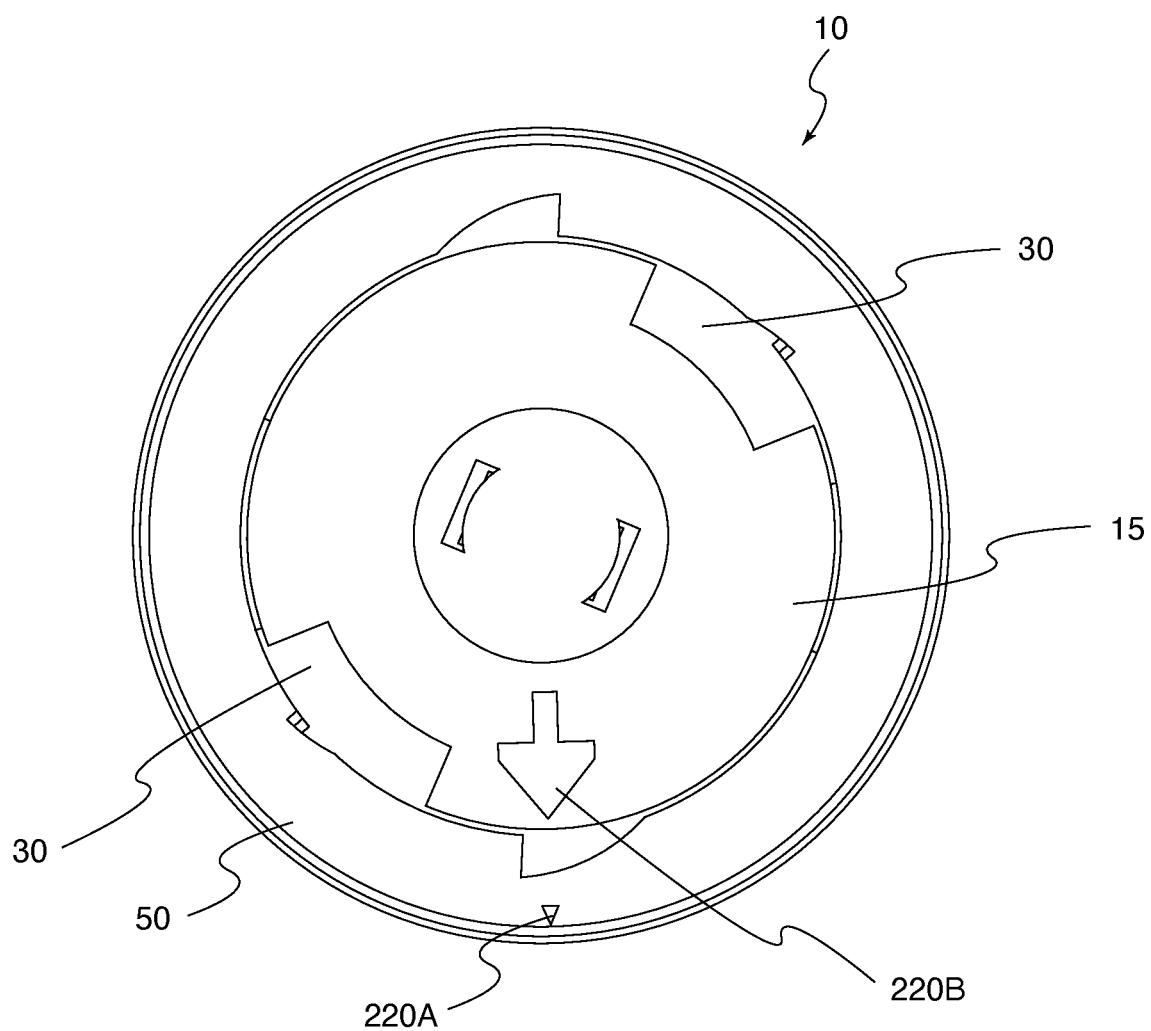
FIG. 4C is a top view of the ornament mounting device in FIG. 4A.

Turning to FIG. 2, the ring member 50 has a pair of through channels 202 formed on opposite sides of the perimeter of the ring member 50. The through channels 202 are dimensioned to accept the key 70. The key 70 when inserted into the through channels 202 in the manner shown in FIGS. 5A, 5B and 5C, compresses the locking pins 30 into the recesses of the base member 15, thus allowing the ring member 50 to rotate back to an unlocked position. The unlocked position can be identified, in some embodiments, by a first indicia 220A provided on the ring member 50 and a corresponding second indicia 220B provided on the base member 15. The ring member 50 is in the unlocked position when the first indicia 220A and the second indicia 220B are aligned. FIG. 4C shows a top view of an assembled hood ornament mounting device 10 with the first indicia 220A and the second indicia 220B aligned in an unlocked position.

Figure 3:
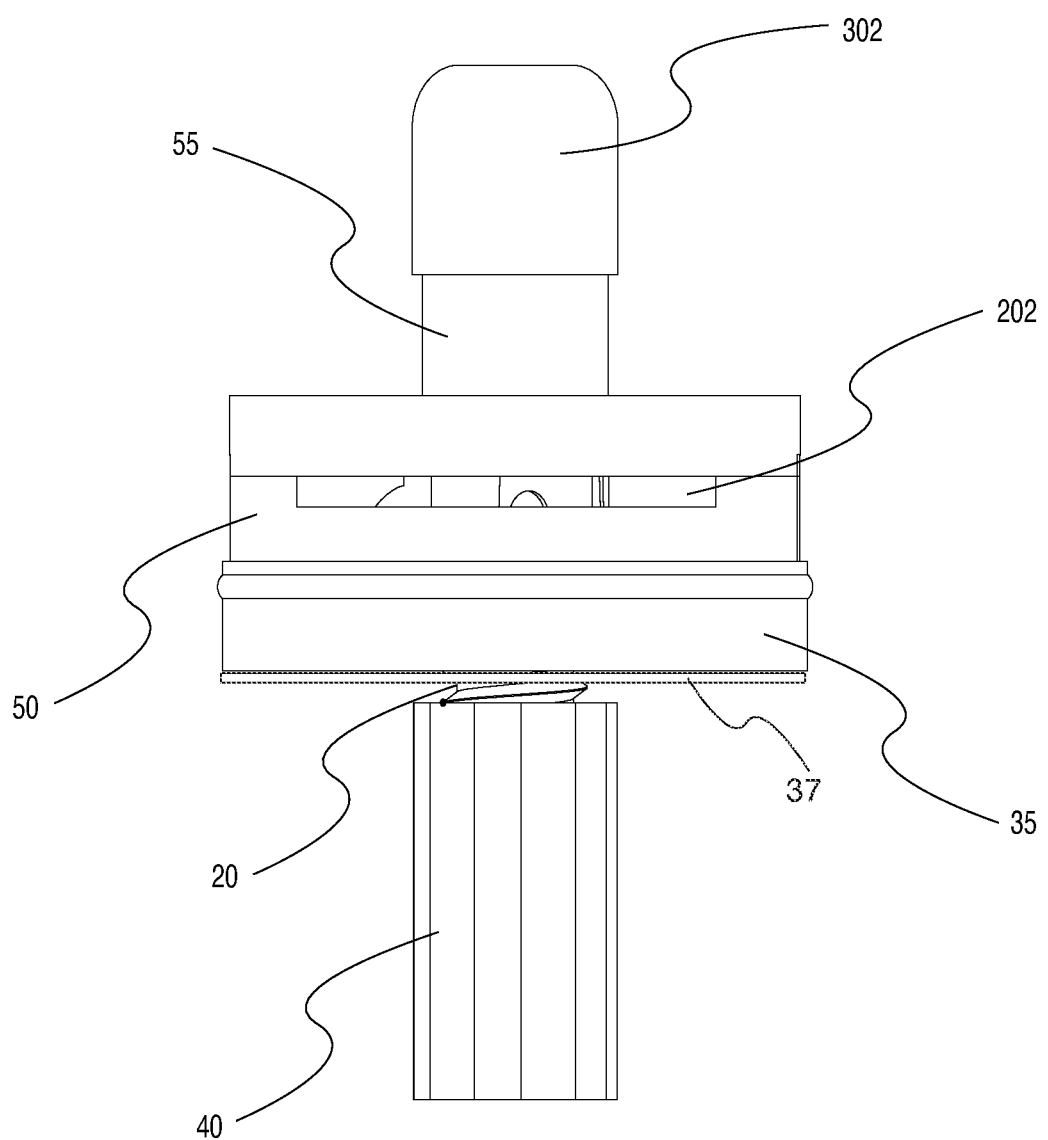
FIG. 3 illustrates an assembled view of the ornament mounting device shown in FIGS. 1 and 2.

FIG. 3 shows hood ornament mounting device 10 in an assembled state. In the embodiment shown, a cap 302 can be placed over the electrical socket 55 instead of a light source 60. The cap 302 can act as a protective cover preventing moisture and particulates from entering the electrical socket 55. FIG. 4A shows an embodiment of an assembled hood ornament mounting device 10 with the light source 60 installed. FIG. 4B shows a bottom view of the assembled hood ornament mounting device 10 showing the hole 402 through which electrical wires (not shown) can be passed from the electrical socket 55 to a power source.

Figure 7:
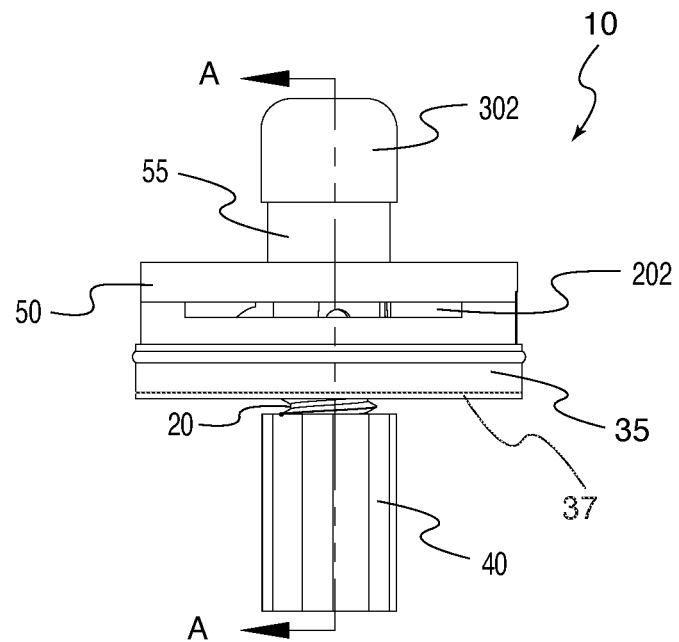
FIG. 7 illustrates an assembled view of the ornament mounting device in FIG. 1.
Figure 8:
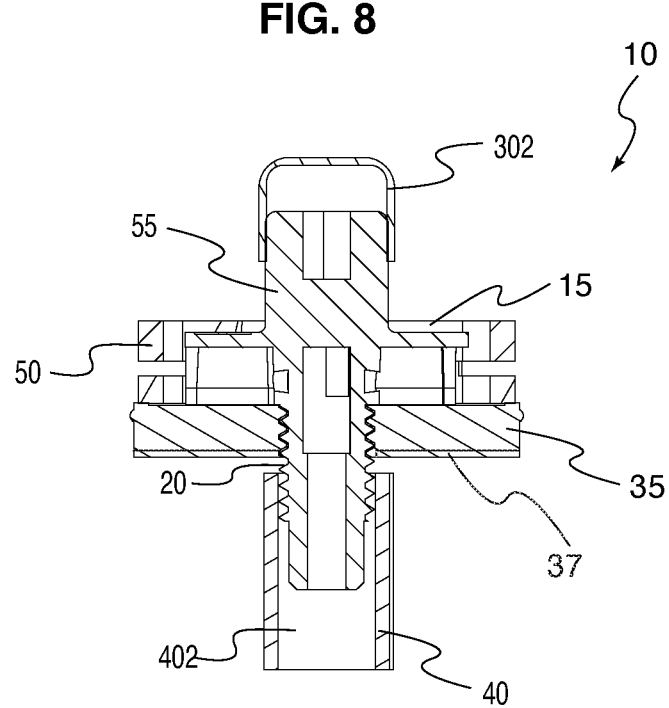
FIG. 8 is a cross section of the ornament mounting device taken along cut line A-A in FIG. 7.

FIG. 7 shows the hood ornament mounting device 10 of FIG. 3 with cut line A-A along which a cross section shown in FIG. 8 is taken.

Figure 9:
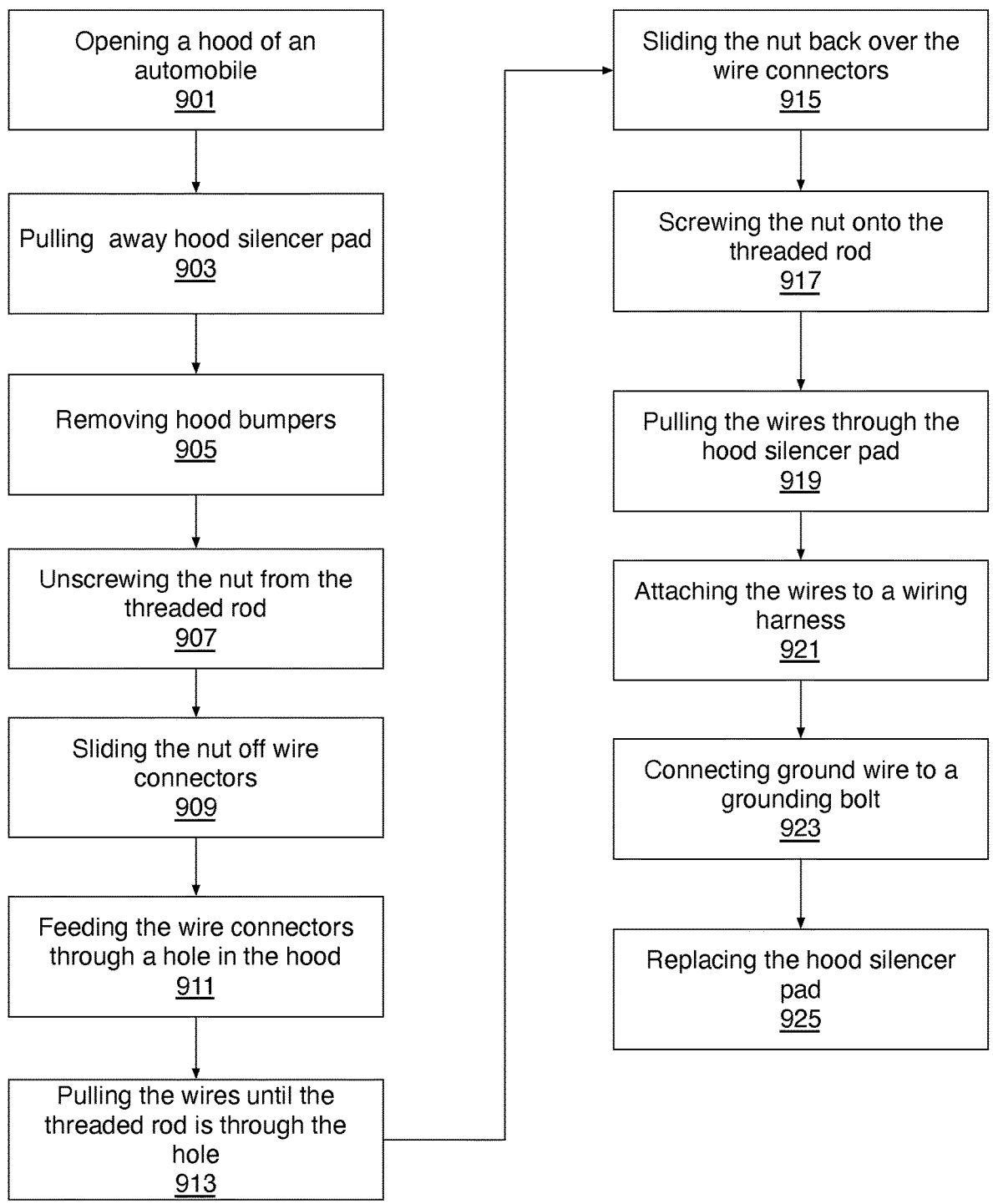
FIG. 9 illustrates a process for installing the ornament mounting device of FIGS. 1-8 to a hood of an automobile, in accordance with an embodiment of the present invention.

FIG. 9 illustrates a process for installing an embodiment of the hood ornament mounting device 10 on an automobile hood. Initially, the installation process begins by an installer opening a hood of the automobile at block 901. The hood silencer pad is pulled away from behind tabs located on each side of the hood at block 903. Using needle nose pliers, at block 905, hood bumpers are removed. The nut 40 is unscrewed, at block 907, from the threaded rod 20. The nut 40 is removed at block 909 by sliding the nut 40 over wire connectors. The wire connectors are fed one at a time through a hole in the hood at block 911. The wires are gently pulled at block 913 until the threaded rod 20 is through the hole. At block 915 the nut 40 is slid over the wire connectors, and the nut 40 is screwed onto the threaded rod 20 until tight at block 917. The wires are pulled through the hood silencer pad at block 919, and attached to wiring harness push pins at block 921. The ground wire is connected to a ground bolt at block 923 using a 10 mm wrench. At block 923, a grounding wire nut located on a side of the engine compartment adjacent to a fuse box is slightly loosened and the ground connectors are slid between the grounding wire nut and the bolt connected to the side of engine compartment. The grounding wire nut is securely tightened. At block 925, the hood silencer pad is replaced behind the tabs on the underside of the hood.

FIGS. 10-32 illustrate another embodiment of an ornament mounting device (hereinafter also "device"), generally designated with numeral 100, according to the present invention. An ornament according to an exemplary embodiment is illustrated in broken lines and designated with reference numeral 102 in FIG. 10. Device 100 includes a light source 120 for illuminating ornament 102, an electrical assembly 124 for controlling operations of light source 120, and a mounting assembly 140 for removably mounting device 100 to a structural surface. As further described below, device 100 includes anti-theft features for preventing and/or hindering removal of ornament 102 and mounting assembly 140 without the use of a special purpose tool 170 (hereinafter also referred to as a "key" or "key element"). Device 100 is therefore configured to effectively prevent and/or hinder the unauthorized removal and/or theft of the ornament. The ornament is shown in dashed lines in FIG. 10 and is generally designated with reference numeral 102.

Figure 30:
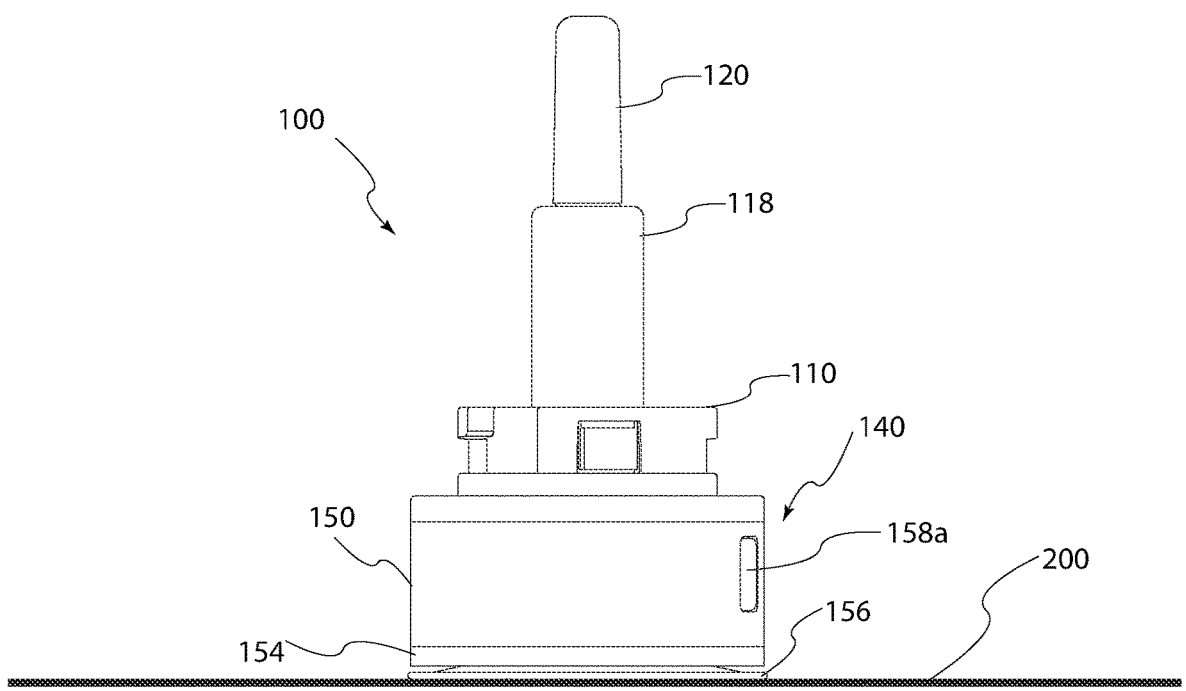
FIG. 30 is a side view of the assembled ornament mounting device of the second embodiment in a state in which it is removably mounted to a structural surface by the engagement assembly.
Figure 31:
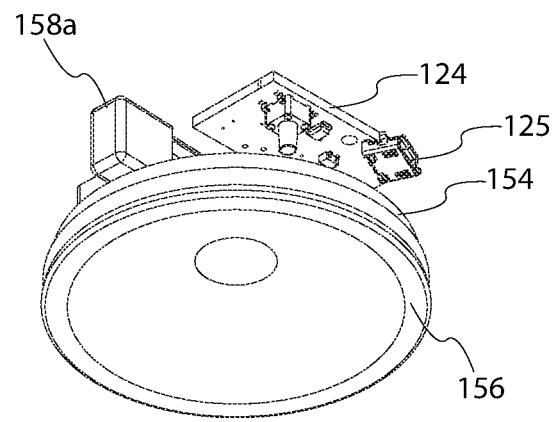
FIG. 31 is a bottom, partial perspective view showing portions of the electrical assembly and mounting assembly of the ornament mounting device of the second embodiment.
Figure 32:
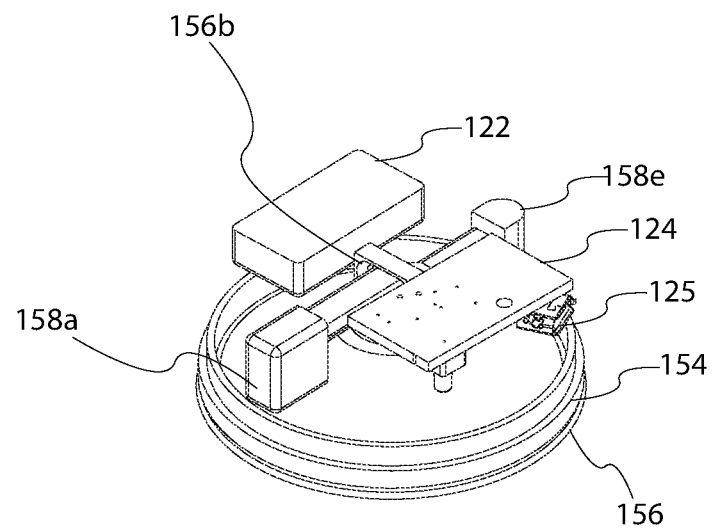
FIG. 32 is a top, partial perspective view showing portions of the electrical assembly and mounting assembly of the ornament mounting device of the second embodiment.

FIGS. 10-20 show device 100 in a state in which it is not configured to be removably mounted to a structural surface by mounting assembly 140. FIGS. 21-29 show device 100 in a state in which it is configured to be removably mounted to a structural surface by mounting assembly 140. FIG. 30 shows device 100 in a state in which it is removably mounted by structural assembly 140 to a structural surface 200. FIGS. 31-32 are partial perspective views showing portions of electrical assembly 124 and mounting assembly 140 of device 100.

Figure 10:
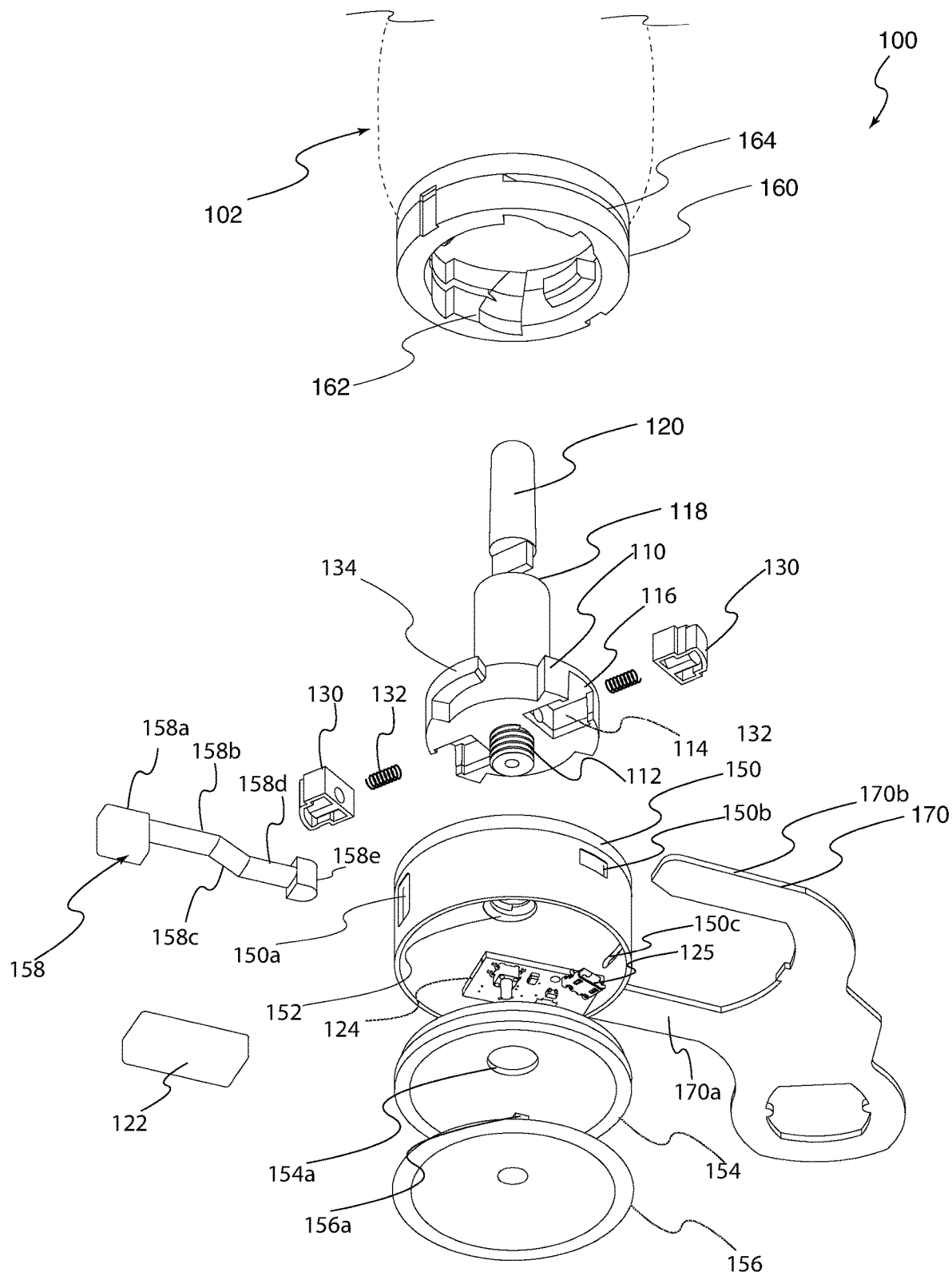
FIG. 10 is an exploded view of an ornament mounting device according to a second embodiment of the present invention.
Figure 11:
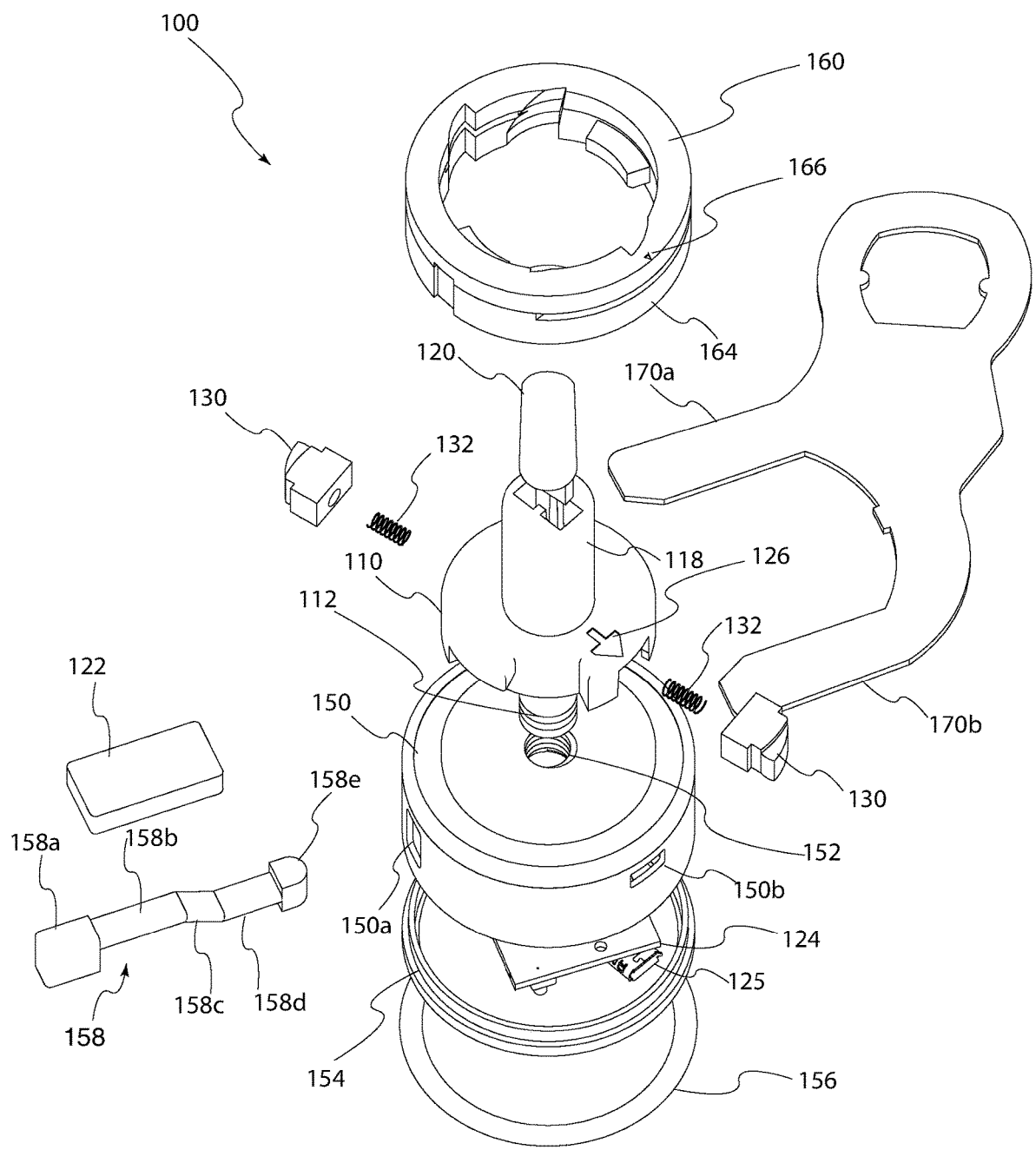
FIG. 11 is another exploded view of the ornament mounting device according to the second embodiment.
Figure 12:
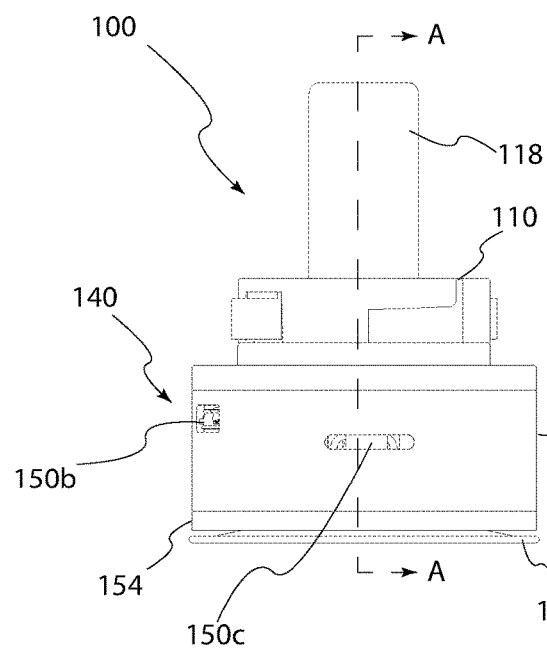
FIG. 12 is a right-side view of the ornament mounting device according to the second embodiment shown in an assembled state, with a structural surface engagement assembly of the ornament mounting device shown in a released state.
Figure 13:
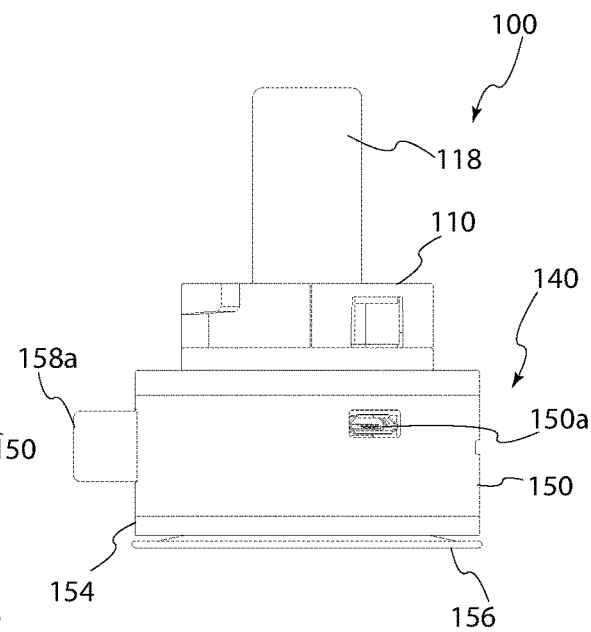
FIG. 13 is a front view of the assembled ornament mounting device of the second embodiment, with the engagement assembly in the released state.
Figure 14:
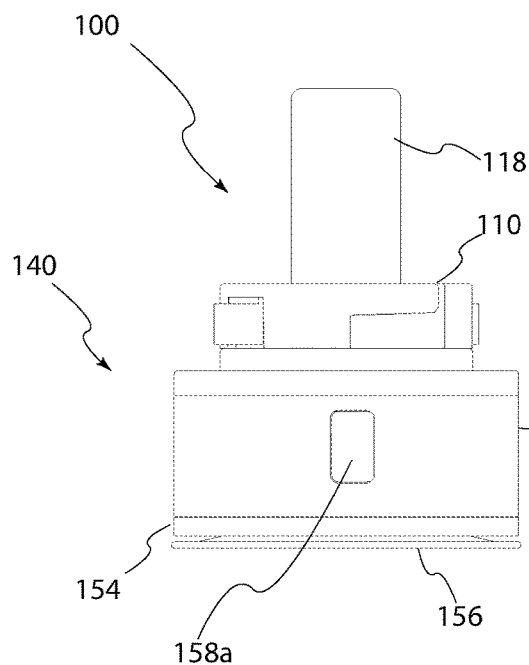
FIG. 14 is a left-side view of the assembled ornament mounting device of the second embodiment, with the engagement assembly in the released state.
Figure 15:
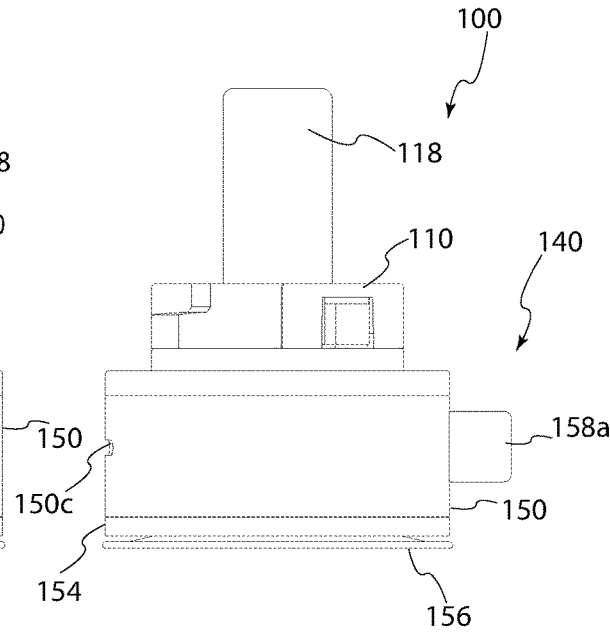
FIG. 15 is a rear view of the assembled ornament mounting device of the second embodiment, with the engagement assembly in the released state.
Figure 16:
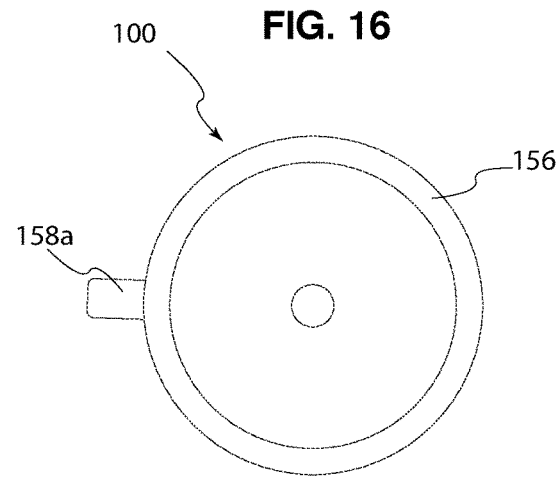
FIG. 16 is a top view of the assembled ornament mounting device of the second embodiment, with the engagement assembly in the released state.
Figure 17:
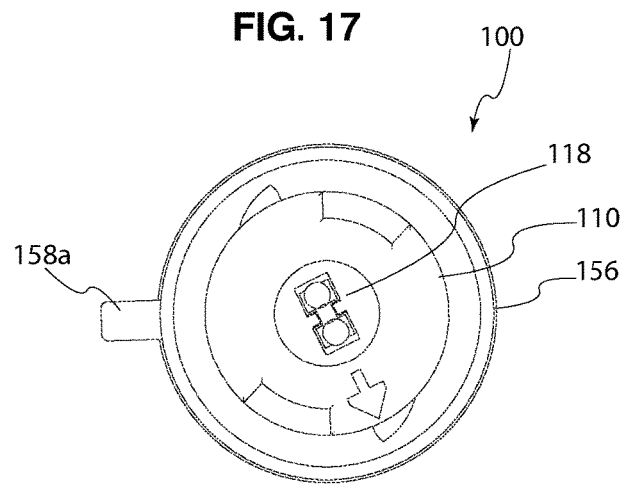
FIG. 17 is a bottom view of the assembled ornament mounting device of the second embodiment, with the engagement assembly in the released state.
Figure 18:
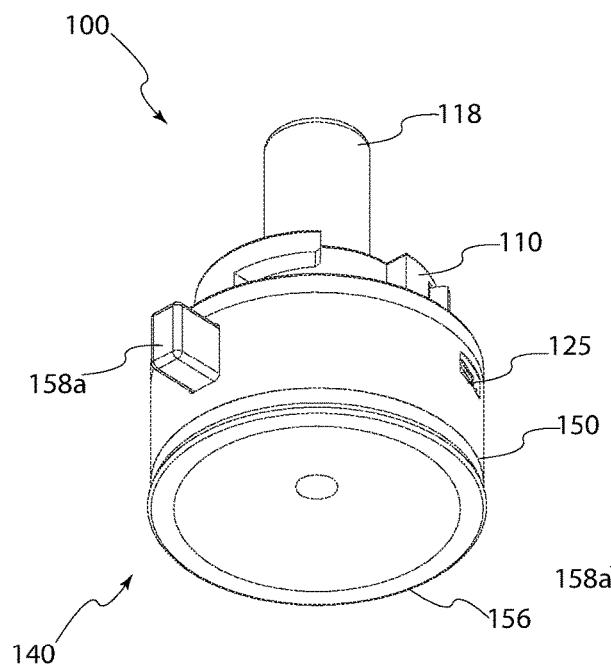
FIG. 18 is a bottom perspective view of the assembled ornament mounting device of the second embodiment, with the engagement assembly in the released state.
Figure 19:
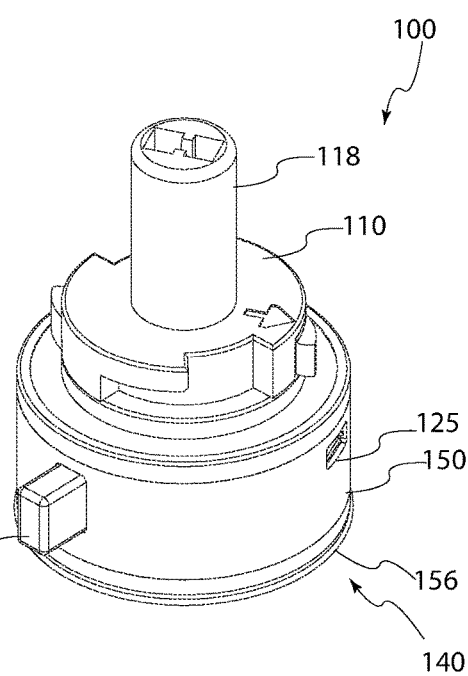
FIG. 19 is a top perspective view of the assembled ornament mounting device of the second embodiment, with the engagement assembly in the released state.

FIGS. 10-11 show exploded views of device 100. Device 100 has a base member 110 which in this embodiment is configured with a generally circular cross section. In this embodiment, base member 110 is configured for permanent, non-removable connection relative to mounting assembly 140. Specifically, base member 110 includes a threaded rod 112 extending from a bottom surface of base member 110. Herein, the term "bottom" refers to a structural surface of base member 110 configured to face and/or contact a surface of a housing member 150 of mounting assembly 140. Threaded rod 112 is configured for threaded engagement with a threaded opening 152 (first aperture) of housing member 150. Additionally, base member 110 and housing member 150 are connected together using a high strength adhesive, for example, such that base member 110 and housing member 150 are permanently connected to one another. This permanent connection refers to a non-removable connection between base member 110 and housing member 150 in that the only way to disconnect these two members from one another would be by breaking them from one another by the application of substantial force. That is, the high strength adhesive for permanently connecting together base member 110 and housing member 150 is selected such that substantial force would be required to disconnect them from one another, and that even if one is able to disconnect them by application of substantial force, base member 110 and/or housing member 150 would be rendered inoperable for reuse (e.g., useless). The adhesive may be an epoxy adhesive exhibiting high tensile strength. It is appreciated, however, that base member 110 and housing member 150 can be permanently connected together as described above by means other than high-strength adhesive, such as by welding or suitable fasteners.

Base member 110 has recess seats 114 formed in recesses 116 on at least two opposing sides along an outside perimeter of the base member 110. Locking pins 130 are seated in the recesses 116. A biasing member 132 supported by the recess seat 114 in each recess 116 exerts an outward force on the locking pin 130 relative to base member 110. Thus, when in an assembled state, locking pins 130 are biased by biasing members 132 in an outward direction (e.g., in a direction away from base member 110). Biasing members 132 can be a compression spring or other appropriate type of spring.

Locking pins 130 lockingly interact with a keyed structure. The keyed structure is formed on an internal perimeter of a support member 160 for supporting ornament 102. In this embodiment, support member 160 is in the form of a ring member, however, it is appreciated that support member 160 is not limited to a member having a ring shape. Ring member 160 includes dentations 162. Base member 110 can be inserted into a central opening defined by the internal perimeter of ring member 160. A quarter turn of ring member 160 with respect to base member 110 causes locking pins 130 to rotate from their insertion position to a locking position within ring member 160. In other embodiments, more or less than a quarter turn of ring member 160 causes locking pins 130 to rotate from their insertion position to the locking position within ring member 160.

Once locking pins 130 are engaged in the locking position, ring member 160 cannot be rotated against base member 110 back to the original, e.g., disengaging, position without use of a key 170. Thus, embodiments of the present invention provide an anti-theft mechanism for ornament 102. Dentations 162 of ring member 160 are configured to slide into grooves 134 of base member 110. With dentations 162 engaged with grooves 134, ring member 160 is securely held by base member 110. As shown in FIGS. 10-11, key 170 includes arms or protrusions 170a, 170b configured to enter through channels 164 of ring member 160. Each protrusion 170a, 170b of key 170 engages with a respective locking pin 130 to exert an inward force on locking pin 130 to unlock locking pin 130 from the keyed structure.

Ring member 160 can be formed as a part of ornament 102 in some embodiments. In other embodiments, ring member 160 can be embedded in ornament 102. In some embodiments, base member 110 includes an electrical socket 118 configured to receive a light source 120, such as a light emitting diode (LED) lamp or incandescent light bulb, for example. Electrical wires from electrical socket 118 can be passed through a hole 112a, shown in FIGS. 20, 29, formed along a longitudinal axis of threaded rod 112 and onward to a wiring harness or battery. In some embodiments, light source 120 can be powered by a replaceable battery 122. In this embodiment, battery 122 is integrated with device 100. Specifically, battery 122 is electrically mounted to electrical assembly 124 housed within housing member 150. Alternatively, battery 122 can be housed in a separate casing and connected by wires to light source 120. Battery 122 can also be a rechargeable battery.

Figure 5A:
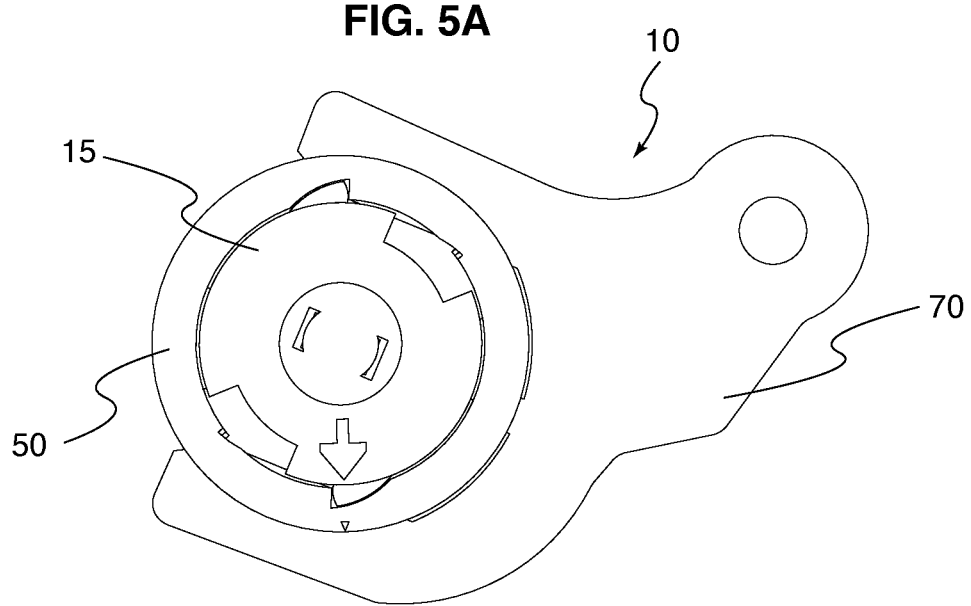
FIG. 5A illustrates a top view of the ornament mounting device shown in FIG. 4A with a key engaged.
Figure 5B:
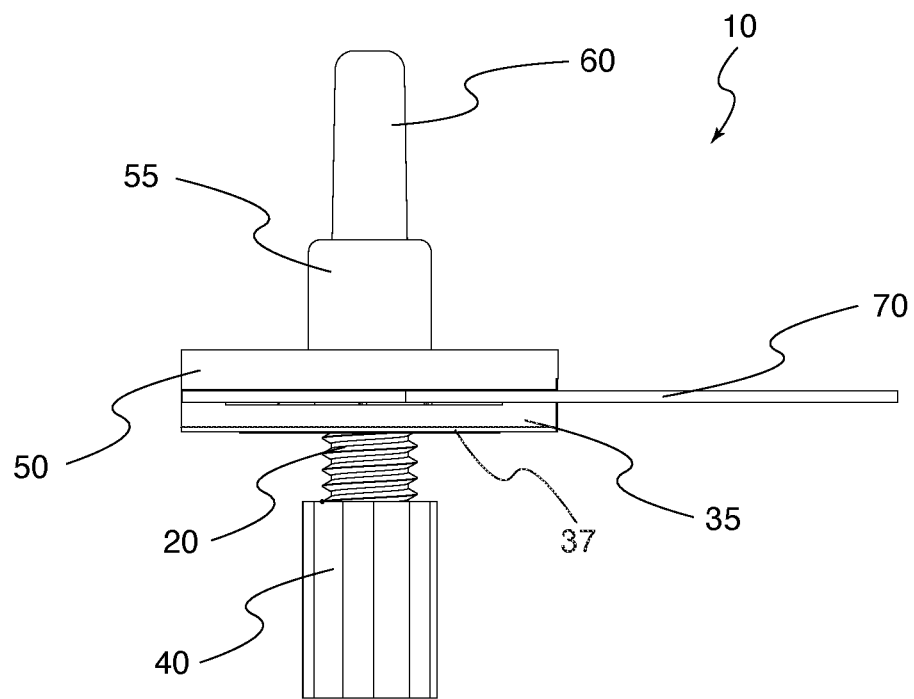
FIG. 5B illustrates a side view of the ornament mounting device shown in FIG. 5A.
Figure 5C:
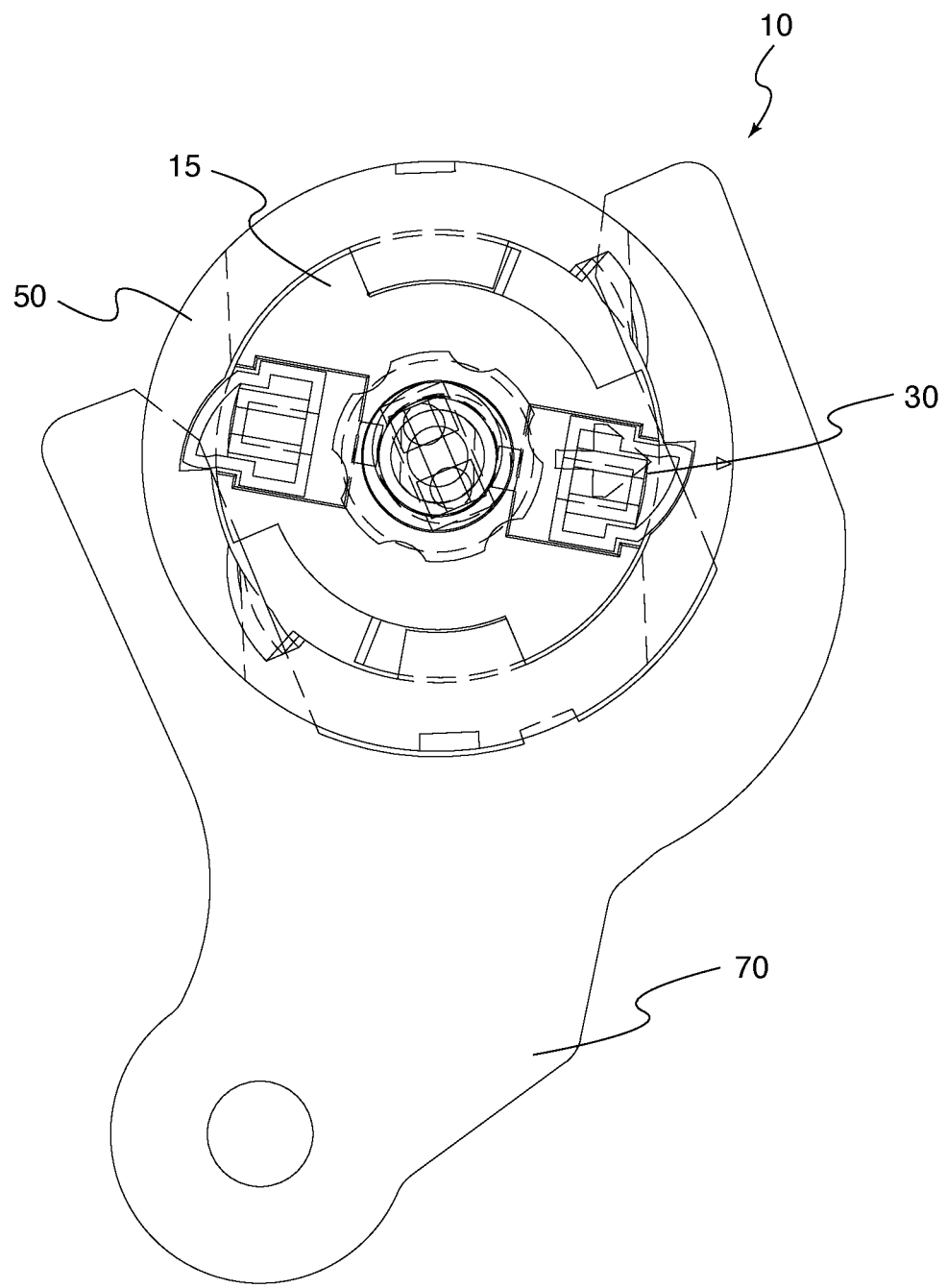
FIG. 5C illustrates a cross sectional top view of the ornament mounting device shown in FIG. 5A taken along a top surface of the key.
Figure 6:
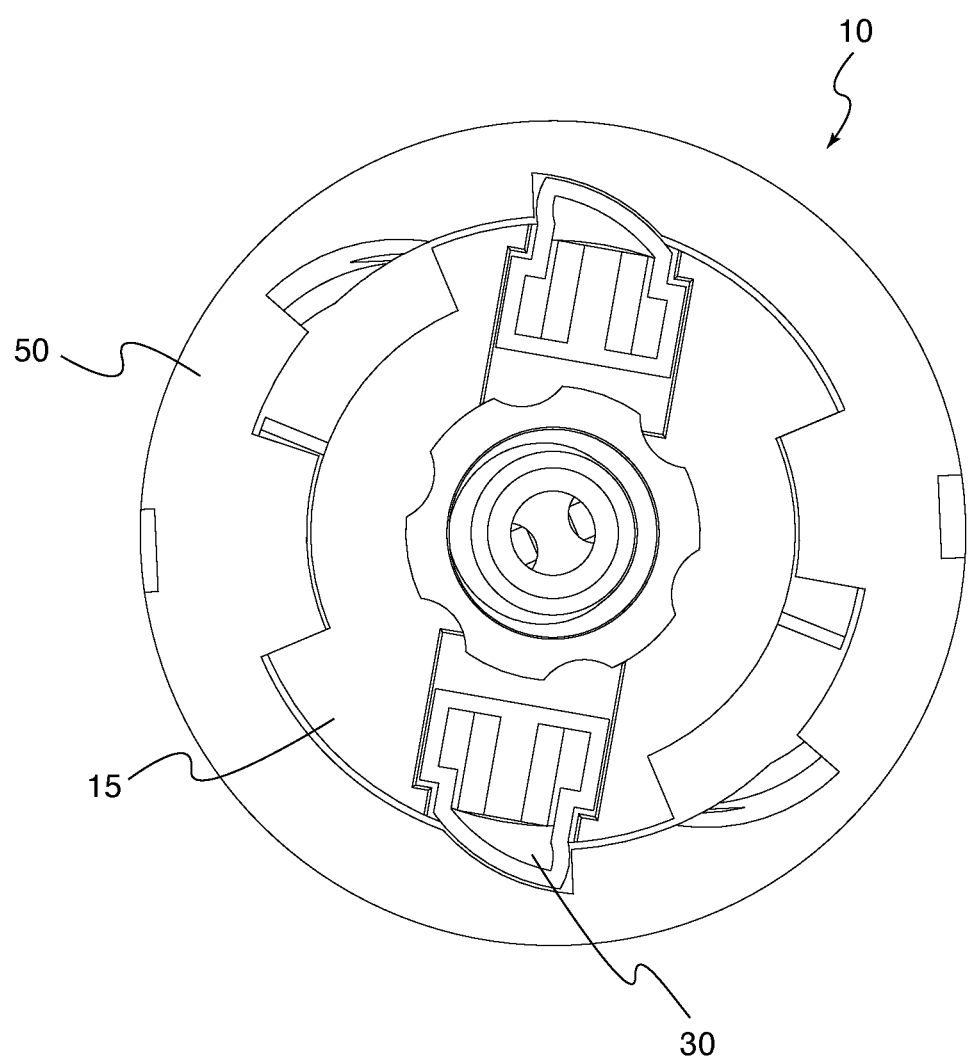
FIG. 6 illustrates a top view of the ornament mounting device shown in FIG. 4A showing locking pins engaged.

Channels 164 of ring member 160 are a pair of through channels formed on opposite sides of the perimeter of ring member 160. Through channels 164 are dimensioned to accept key 170. As can be appreciated from the present description with reference to the figures, ring member 160 has the same construction as ring member 50 described above with reference to the embodiment of FIGS. 1-8. When inserted into through channels 164 in the same manner as key 70 is inserted into through channels 202 as shown in FIGS. 5A, 5B and 5C, key 170 compresses locking pins 130 into recesses 116 of base member 110, thus allowing ring member 160 to rotate back to an unlocked position. The unlocked position can be identified, in some embodiments, by a first indicia 166 provided on ring member 160 and a corresponding second indicia 126 provided on base member 110. Ring member 160 is in the unlocked position when first indicia 166 and second indicia 126 are aligned, similar to the embodiment of FIG. 4C in which first indicia 220A and second indicia 220B are aligned to show ring member 50 in an unlocked position as described above.

According to the embodiment of the present invention, mounting assembly 140 for removably connecting device 100 to a structural surface includes housing member 150, a holding member 154, a suction cup device 156 (hereinafter also referred to as "suction cup") configured to provide a suction force for removably connecting housing member 150 (and thus device 100) to a structural surface by suction, and an actuating member, generally designated with reference numeral 158 (hereinafter also "actuator") for activating/deactivating a suction force of suction cup 156.

As described above, housing member 150 has threaded opening 152 configured for threaded engagement with threaded rod 112 of base member 110, and housing member 150 and base member 110 are permanently connected together using a high-strength adhesive, or by welding, for example. Holding member 154 is configured for secured connection to a bottom portion of housing member 156, such as by welding or gluing, and for holding actuator 158 relative to housing member 150. As further described below, actuator 158 is configured for undergoing movement relative to housing member 150 and holding member 154 between a first position and a second position. In the first position (FIGS. 21-30, 33), actuator 158 is configured to activate suction cup 156 to generate a suction force for removably connecting device 100 to a structural surface. In the second position (FIGS. 12-20), actuator 158 is configured to deactivate suction cup 156 and release the suction force to allow device 100 to be removed from the structural surface.

Figure 20:
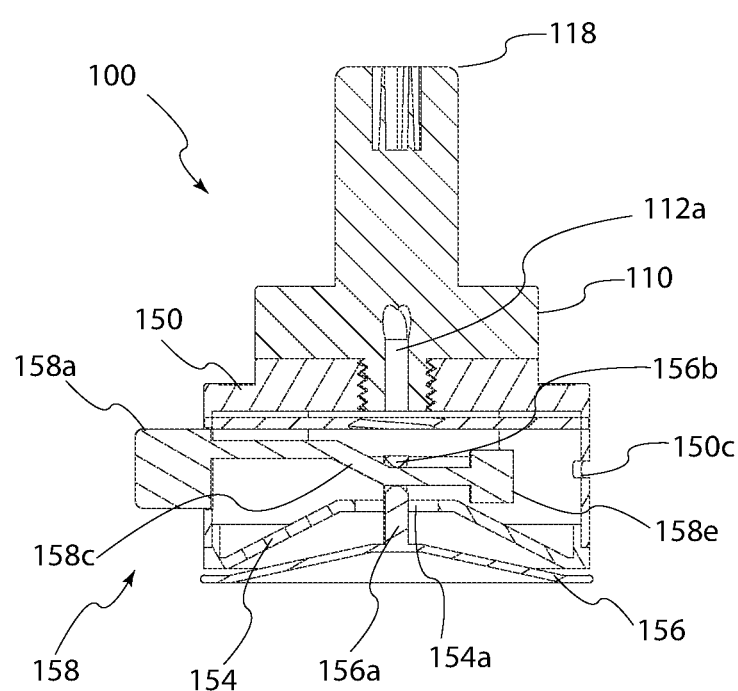
FIG. 20 is a cross-sectional view of the assembled ornament mounting device taken along cut line A-A in FIG. 12, with the engagement assembly in the released state.
Figure 21:
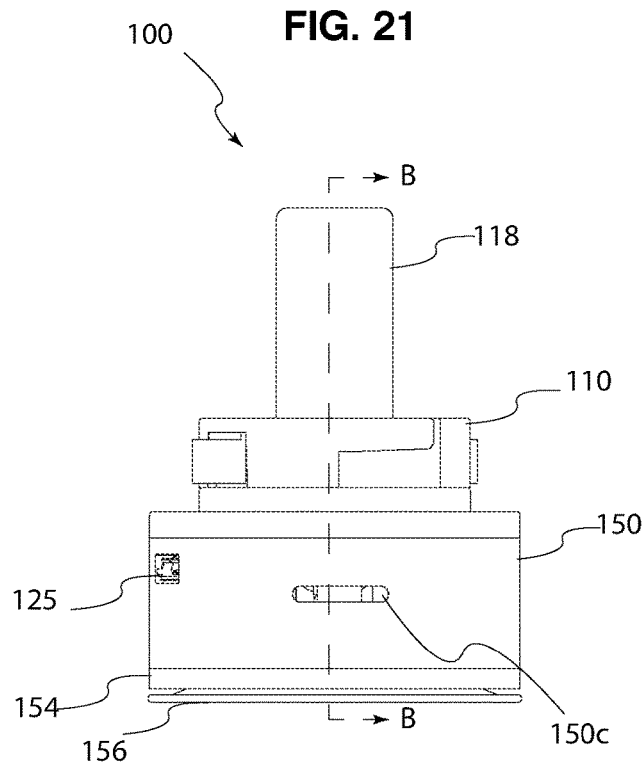
FIG. 21 is a right-side view of the ornament mounting device according to the second embodiment shown in an assembled state, with a structural surface engagement assembly of the ornament mounting device shown in an engaged state.
Figure 22:
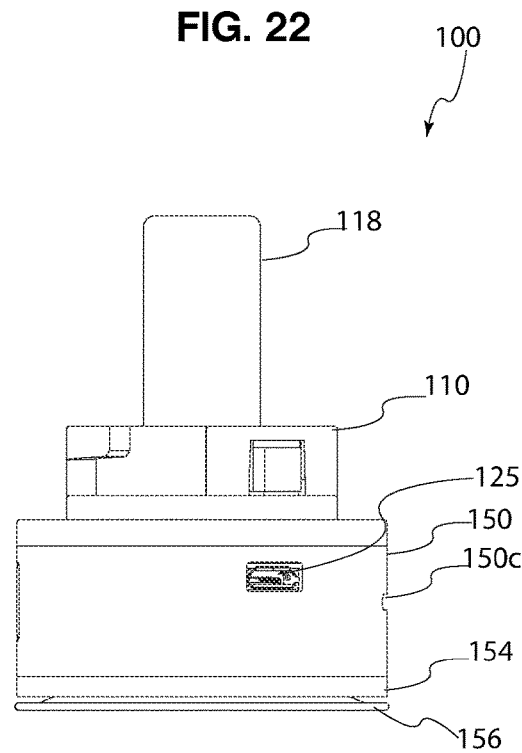
FIG. 22 is a front view of the assembled ornament mounting device of the second embodiment, with the engagement assembly in the engaged state.
Figure 23:
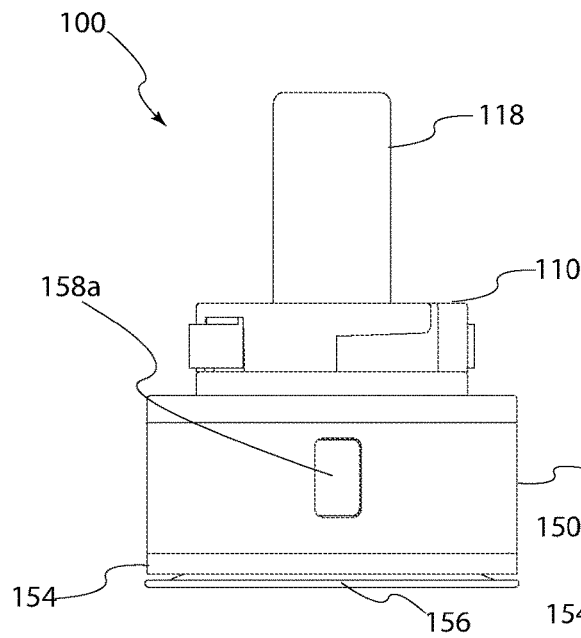
FIG. 23 is a left-side view of the assembled ornament mounting device of the second embodiment, with the engagement assembly in the engaged state.
Figure 24:
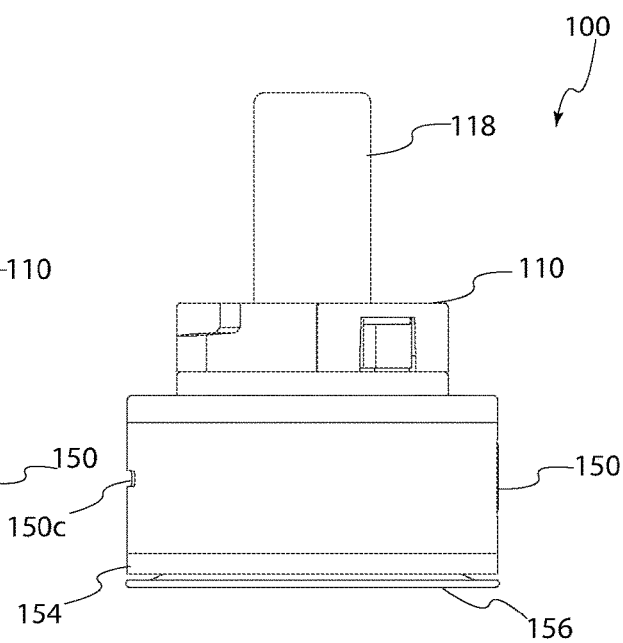
FIG. 24 is a rear view of the assembled ornament mounting device of the second embodiment, with the engagement assembly in the engaged state.
Figure 25:
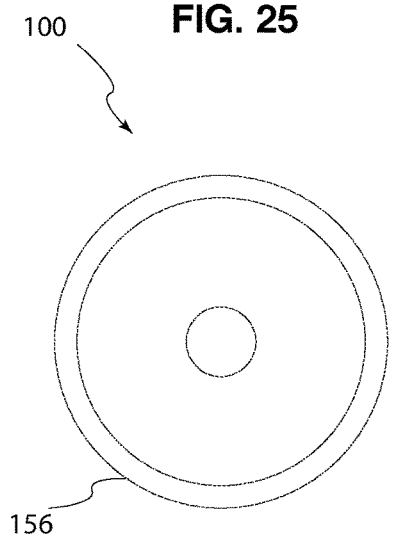
FIG. 25 is a top view of the assembled ornament mounting device of the second embodiment, with the engagement assembly in the engaged state.
Figure 26:
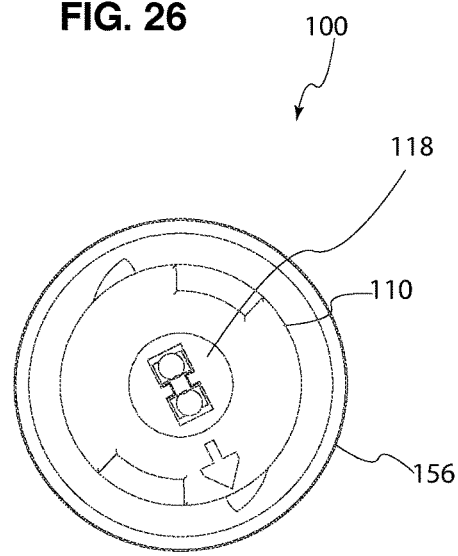
FIG. 26 is a bottom view of the assembled ornament mounting device of the second embodiment, with the engagement assembly in the engaged state.
Figure 27:
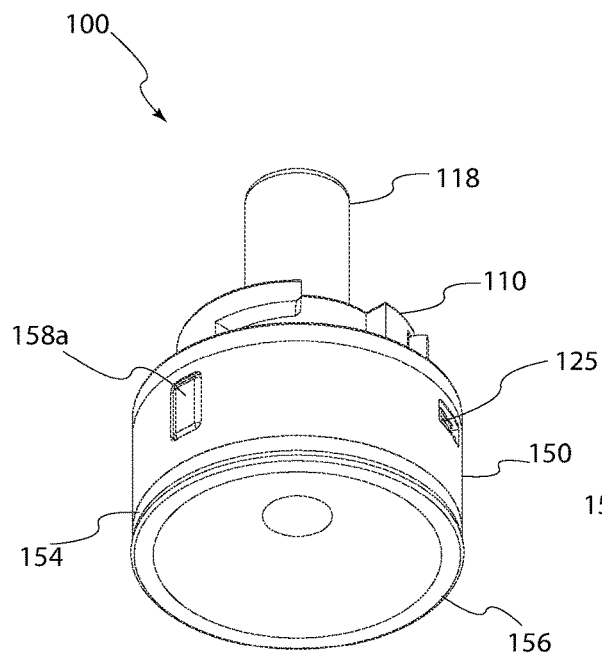
FIG. 27 is a bottom perspective view of the assembled ornament mounting device of the second embodiment, with the engagement assembly in the engaged state.
Figure 28:
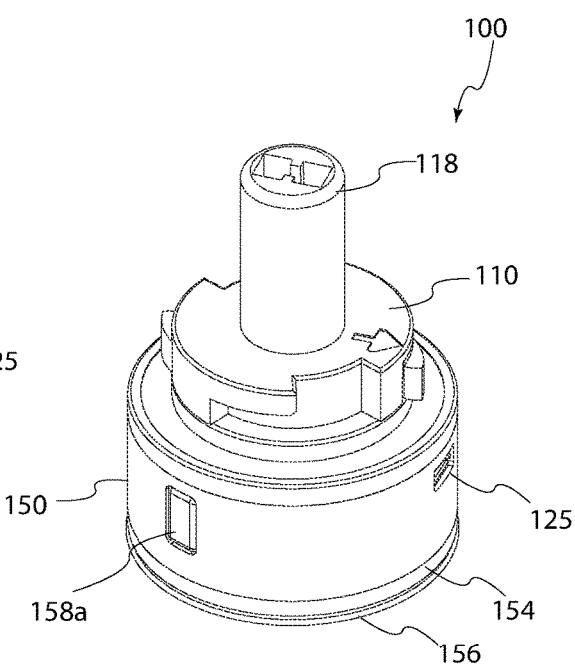
FIG. 28 is a top perspective view of the assembled ornament mounting device of the second embodiment, with the engagement assembly in the engaged state.
Figure 29:
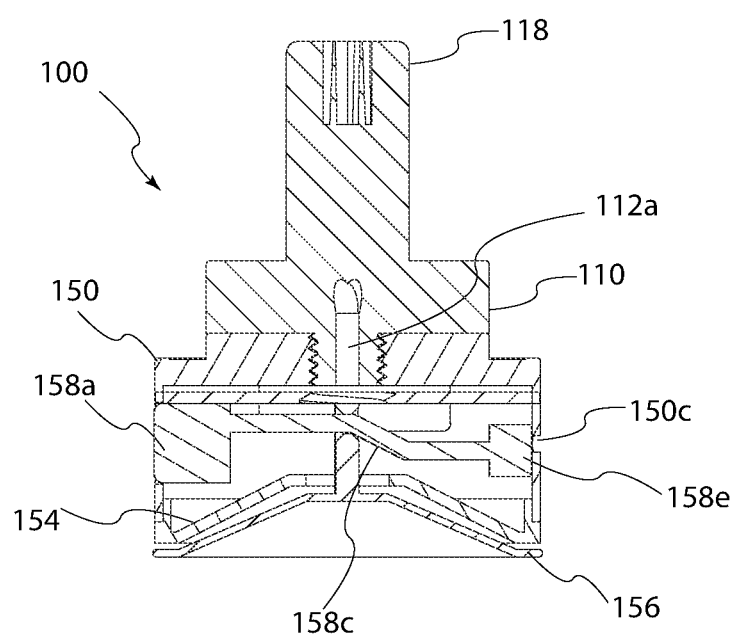
FIG. 29 is a cross-sectional view of the assembled ornament mounting device taken along cut line B-B in FIG. 21, with the engagement assembly in the engaged state.

As best shown in FIGS. 20 and 29, holding member 154 includes a central opening 154a configured to be generally aligned with threaded opening 152 of housing member 150. Suction cup 156 has a post member 156a configured to extend through central opening 154a of holding member 154. Post member 156a has an opening 156b through which a portion of actuator 158 is configured to move and extend during movement of actuator 158 between the first (FIG. 29) and second (FIG. 20) positions. Post member 156a, including opening 156b, therefore provides a means for guiding actuator 158 between the first and second positions.

In this embodiment, actuator 158 is preferably a unitary structural element, including portions 158a-158e, formed in one piece from a single piece of material. Portions 158a and 158e define opposite first and second terminal ends of actuator 158. Portions 158b and 158d extend directly from portions 158a and 158e, respectively. Portion 158c extends between portions 158b and 158d in an inclined manner as shown in FIGS. 10, 11, 20 and 29.

Housing member 150 has a side opening (second aperture) 150a through which first terminal end 158a of actuator 158 is configured to pass during movement of actuator 158 between the first and second positions. Housing member 150 has another side opening (third aperture) 150c providing access to second terminal end 158e of actuator 158. Thus, in the second position of actuator 158 shown in FIGS. 12-20, first terminal end 158a is accessible by a user to activate suction cup 156 by pressing (e.g., manually) terminal end 158a into opening 150a such that actuator 158 moves in the right direction as depicted in FIGS. 20, 29 until actuator 158 achieves the first position shown in FIGS. 21-30, 33. In the first position of actuator 158 shown in FIGS. 21-30, second terminal end 158e is accessible to a user via opening 150c to deactivate suction cup by pressing terminal end 158e (e.g., using key 170 as further described below) so that actuator 158 moves in the left direction as depicted in FIGS. 20, 29 until actuator 158 achieves the second position shown in FIGS. 12-20.

As noted above, portion 158c of actuator 158 extends at an inclination between portions 158b and 158d. Specifically, as shown in FIGS. 20 and 29, portion 158c is inclined downwardly from portion 158b to portion 158d. As shown in FIG. 29, in the first position of actuator 158, a top end of inclined portion 158c is positioned proximate opening 156b of suction cup post 156a. On the other and, as shown in FIG. 20, in the second position of actuator 158, a bottom end of inclined portion 158c is positioned proximate opening 156b of post 156a.

Figure 33:
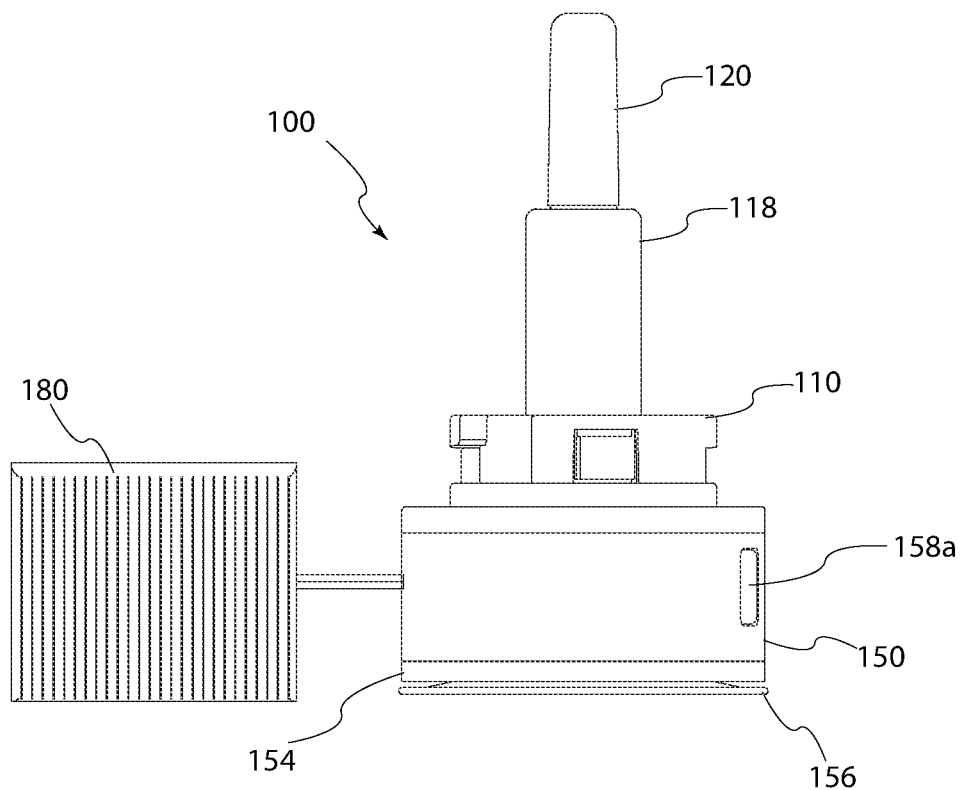
FIG. 33 illustrates another embodiment of the ornament mounting device of the present invention incorporating a solar panel for charging and providing power to the ornament mounting device.

Starting from the second position of actuator 158 shown in FIG. 20, when first end portion 158a of actuator is pressed into opening 150a of housing member 150, inclined portion 158c of actuator 158 passes through opening 156b of suction cup 156 to cause suction cup 156 to be displaced upward until actuator 158 achieves the first position shown in FIG. 29. The upward displacement of suction cup 156 activates the suction force necessary to cause device 100 to be securely removably mounted to a structural surface 200 as shown in FIG. 33. Deactivation of the suction force is achieved by pressing second terminal end 158e of actuator 158 via opening 150c of housing member 150 (e.g., using key 170) as described above. During deactivation of the suction force, suction cup 156 is caused to be displaced downward until actuator 158 achieves the second position shown in FIG. 20. It is appreciated that the foregoing upward and downward movement of suction cup 156 during activation and deactivation, respectively, of the suction force is accomplished by the inclined configuration of portion 158c of actuator 158, as best shown in FIGS. 20, 29, as portion 158c moves through opening 156b of suction cup 156 during movement of actuator 158 between the first and second positions.

As described above, deactivation of the suction force generated by suction cup 156 is achieved by pressing second terminal end 158e of actuator 158 via opening 150c of housing member 150. According to an embodiment of the present invention, this can be accomplished by using anyone of protrusions 170a, 170b of key 170. Specifically, at least a front end portion of each protrusion 170a, 170b is preferably configured (e.g., shaped and sized) to be able to be passed through opening 150c of housing member 150 so that second terminal end 158e of actuator 158 can be pressed by the protrusion until actuator 158 is moved from the first position shown in FIG. 29 to the second position shown in FIG. 20. By this construction, it is a feature of the present invention that key 170, as a single element, is configured both for rotating ring member 160 against base member 110 back to the original, e.g., disengaging, position, and for moving actuator 158 from the first position to the second position as described above.

In an alternative embodiment, second terminal end 158e of actuator 158 can be pressed with an element or tool other than key 170, provided that such element or tool is specially configured (e.g., shaped and sized) to be able to be passed through opening 150c of housing member 150.

In the present embodiment, device 100 includes a USB connector 125 used to connect an external device so as to be able to communicate with that external device. USB connector is connected to electrical assembly 124 and is accessible via another side opening 150b (fourth aperture) of housing member 150. USB connector 125 can also be used as a power interface for device 100 (e.g., to charge rechargeable battery 122).

In another embodiment shown in FIG. 33, device 100 is a solar-powered mounting device for ornaments. Specifically, device 100 is provided with a solar panel 180 for receiving sunlight to charge and provide power to device 100. Solar panel 180 can be connected externally to device 100 as shown in FIG. 33. Alternatively, solar panel 180 can be integrated on any surface of device 100, such as a surface of housing member 150, for example.

Figure 34:
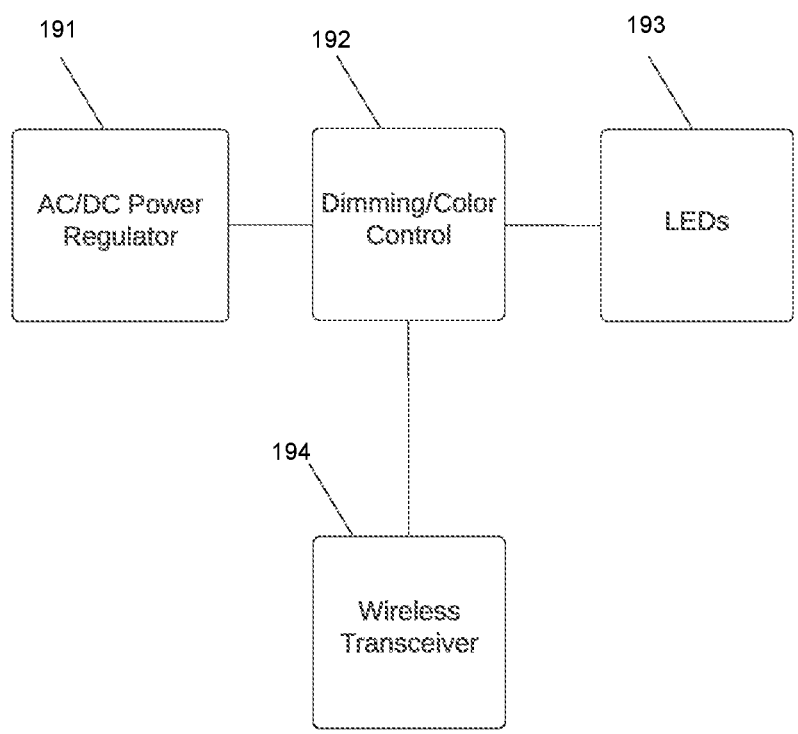
FIG. 34 is a block diagram illustrating components for remotely controlling a light source (e.g., an LED lamp) of the ornament mounting device according to an embodiment of the present invention.

As noted above, light source 120 may be a light emitting diode (LED) lamp. Turning now to FIG. 34, a block diagram of an example of an LED lamp 120 according to an embodiment of the present invention is illustrated. LED lamp 120 may include one or more LEDs 193 of any type desired. LED lamp 120 may also include an AC/DC power regulator circuit 191 to process the typical line voltage to meet the voltage and current requirements of LED lamp 120. For example, a 110V/120V AC line voltage may be converted to a lower voltage constant current DC output(s) for LEDs 193 and control circuitry. LED lamp 120 may also include dimming and color control circuitry 192 as desired to control the intensity and color of the light from LED lamp 120. LED lamp 120 may also include a wireless transceiver 194 to receive wireless control signals and to transmit status information as desired to an external controller.

Some embodiments of the LED lamp 120 may support multiple sources of dimming or color control, including wired from a controller including, for example, a dimmer, and wireless such as with a portable and remote RF controller or any combination of such control. The wireless controller may include a power source such as a battery, either replaceable or rechargeable or other forms of power including solar, thermal or mechanical vibration energy and power. The circuitry may also be designed to achieve high power factor and may also be designed to protect LEDs from over voltage input and output conditions by limiting the current while still retaining a high power factor. The circuitry may also be designed to switch or change from dimming mode in an automatic or manual fashion to a universal power supply mode with either constant current or constant voltage once a prescribed set of conditions exist, for example, an input voltage, average or peak, or both, is greater than a prescribed, predetermined, set, and other set of conditions, etc. level.

In other embodiments, wireless transceiver 194 can be configured to allow adjustment of operating parameters of device 100, such as settings, parameters, and preferences, for example, by way of a graphical user interface (GUI) provided on a computing device, for example, a smartphone, tablet or computer. Thus, the present embodiment can allow simplified adjustment of device 100 by the user by way of the GUI. The GUI can include various interface elements, such as, for example, graphical representations of dials, sliders, toggles, check boxes, radio buttons, and text input fields. The various interfaces can be implemented to adjust individual settings of device 100.

In some embodiments, the GUI can include factory preset values for various operating parameters of device 100 from which a user of device 100 can select. Further, a user can store, by way of the GUI in some embodiments, one or more custom configurations directed to different settings for device 100. The GUI can be implemented as an application (APP) installable on the computing device, such as mobile terminals (e.g., smartphones).

In other embodiments, wireless transceiver 194 may be a Bluetooth® transceiver configured to provide wireless control of light source 120 via a mobile device. The Bluetooth® transceiver can be configured to turn light source 120 on/off, change the light intensity, or change the light color (e.g., wavelength) of light source 120. A dedicated APP for a Bluetooth® pairing can be executed in the mobile terminal.

Figure 35:
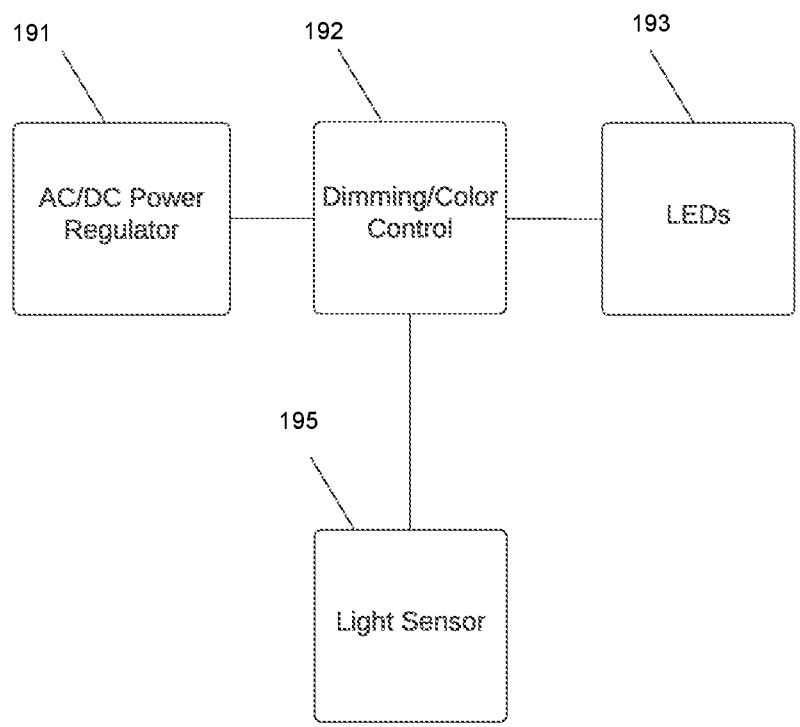
FIG. 35 is a block diagram illustrating components of the ornament mounting device according to an embodiment of the present invention featuring a light sensor.
Figure 36:
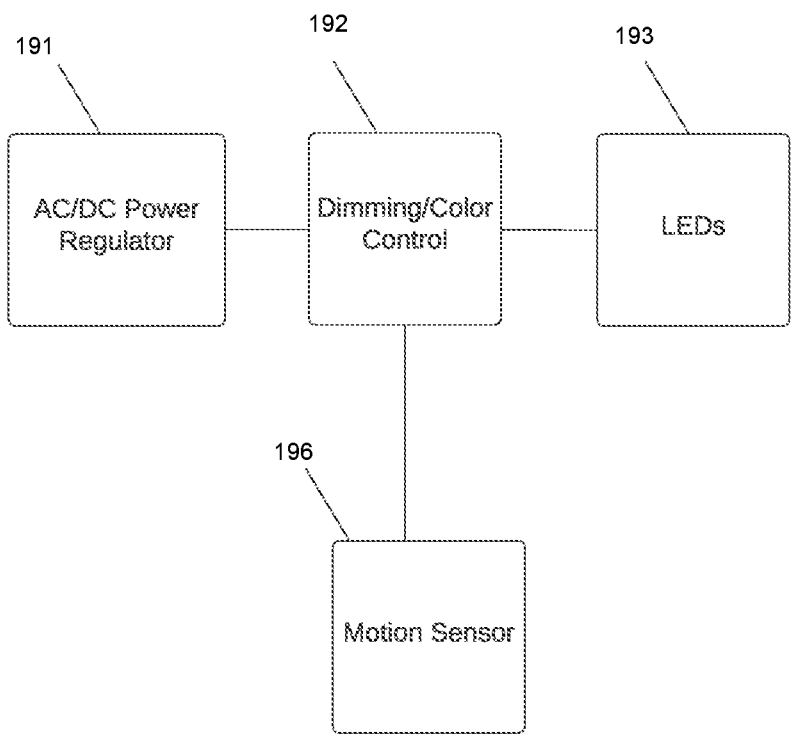
FIG. 36 is a block diagram illustrating components of the ornament mounting device according to an embodiment of the present invention featuring a motion sensor.

In still other embodiments, device 100 can include a light sensor 195, as shown in FIG. 35, configured to activate LEDs 193 when ambient light falls below a threshold. In yet other embodiments, device 100 can include a motion sensor 196, as shown in FIG. 36, configured to activate LEDs 193 when the structure on which device 100 is mounted, such as a vehicle, is in motion.

It will be appreciated that device 100 according to the foregoing embodiments of the present invention may include one or more than one of the above features, e.g., USB, solar panel, wireless transceiver, light sensor, motion sensor, etc., and in various combinations depending on the desired functionalities for device 100.

Ornament mounting device 100 according to the above-described embodiments is adapted to be removably mounted to any structural surface, including horizontal and vertical wall surfaces, various type of furniture components, and to various interior (e.g., dashboards) and exterior (e.g., automobile hoods) areas of vehicles. Device 100 is particularly adapted to be removably mounted to any vehicle, such as motorcycles, boats, RVs, tractor trailers, ATVs, delivery trucks, mail carrier vehicle, emergency vehicles (police, fire, ambulance), construction equipment, bus (school and public transit), tractors, personal watercraft, trains, snowmobile, taxi, for example. Ornament mounting device 100, including anti-theft features, may also have applications as home décor and various residential and commercial lighting applications.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. An ornament mounting device, comprising:
    a support member configured for supporting an ornament, the support member having a keyed structure, including dentations, along an internal perimeter of the support member, and a pair of through channels formed along an outside perimeter of the support member at opposite regions;
    a base member having a top surface dimensioned to fit within the internal perimeter of the support member, a bottom surface, a perimeter disposed between the top and bottom surfaces, a pair of recesses formed at opposite regions along the perimeter, and grooves formed on the perimeter and configured to accommodate the dentations of the support member;
    a locking pin seated in each of the pair of recesses of the base member, each said locking pin including a biasing member configured to exert an outward force on the locking pin relative to the base member and configured to lockingly interact with the keyed structure of the support member; and
    a mounting assembly for removably mounting the support member and the base member to a structural surface.

2. The ornament mounting device of claim 1, wherein the mounting assembly comprises a housing member, a holding member connected to the housing member, a suction cup device configured for connection to the holding member and to provide a suction force for removably connecting the housing member to the structural surface by suction, and an actuating member for activating/deactivating a suction force of the suction cup device.

3. The ornament mounting device of claim 2, wherein the base member has a threaded rod extending from the bottom surface of the base member; and wherein the housing member has a threaded opening configured for threaded engagement with the threaded rod of the base member to securely removably connects housing member to base member.

4. The ornament mounting device of claim 2, wherein the actuator is configured for undergoing movement relative to the holding member between a first position, in which the actuator is configured to activate the suction cup device to generate a suction force for removably connecting the ornament mounting device to a structural surface, and a second position, in which the actuator is configured to deactivate the suction cup device and release the suction force to allow the ornament mounting device to be removed from the structural surface.

5. The ornament mounting device according to claim 4, wherein the suction cup device includes means for guiding the actuator between the first and second positions.

6. The ornament mounting device according to claim 5, wherein the holding member includes a central opening configured to be generally aligned with threaded the opening of the housing member; and wherein the means for guiding the actuator comprises a post member of the suction cup device configured to extend through the central opening of the holding member, the post member having an opening through which a portion of the actuator is configured to move and extend during movement of the actuator between the first and second positions.

7. The ornament mounting device of claim 6, wherein the support member is configured for undergoing rotational movement; and wherein a quarter turn of the support member with respect to the base member causes the locking pins to rotate from an insertion position to a locking position within the support member.

8. The ornament mounting device of claim 7, further comprising a key element for removing the locking pins from the locking position to allow the support member to be rotated against the base member to a disengaging position.

9. The ornament mounting device of claim 8, wherein the housing member has an opening configured to receive therethrough a portion of the key element for contacting one end of the actuator and move the actuator from the first position to the second position.

10. The ornament mounting device of claim 8, wherein the housing member has another opening through which another end of the actuator extends to the exterior of the housing member in the second position of the actuator; and wherein while extending to the exterior of the housing member, the another end of the actuator is configured to be manually pushed towards an interior of housing member to move the actuator from the second position to the first position.

11. The ornament mounting device of claim 1, wherein the base member includes an electrical socket configured to receive a light source; and further comprising an electrical assembly for providing electrical power to the light source.

12. The ornament mounting device of claim 11, further comprising a USB connector connected to the electrical assembly for use as a power interface to supply the power to the electrical assembly.

13. The ornament mounting device of claim 11, wherein the light source is powered by a replaceable battery.

14. The ornament mounting device of claim 11, further comprising a solar panel for receiving sunlight to supply the power to the electrical assembly for providing the electrical power to the light source.

15. The ornament mounting device of claim 11, further comprising a wireless transceiver for wirelessly controlling operations of the light source.

16. The ornament mounting device of claim 15, further comprising a portable and remote RF controller for wireless communication with the transceiver to control operations of the light source.

17. The ornament mounting device of claim 15, wherein the wireless transceiver comprises a Bluetooth® transceiver.

18. The ornament mounting device of claim 11, further comprising a light sensor configured to activate the light source when ambient light falls below a threshold.

19. The ornament mounting device of claim 11, further comprising a motion sensor configured to activate the light source when the structural surface on which the ornament mounting device is mounted is in motion.

20. The ornament mounting device of claim 19, wherein the structural surface is a hood of an automobile.

* * * * *